US009864905B2

(12) United States Patent
Tanaka et al.

(10) Patent No.: US 9,864,905 B2
(45) Date of Patent: Jan. 9, 2018

(54) INFORMATION PROCESSING DEVICE, STORAGE MEDIUM STORING INFORMATION PROCESSING PROGRAM, INFORMATION PROCESSING SYSTEM, AND INFORMATION PROCESSING METHOD

(71) Applicant: NINTENDO CO., LTD., Kyoto, OT (JP)

(72) Inventors: Wataru Tanaka, Tokyo (JP); Yusuke Kitazono, Mitaka (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/001,504

(22) Filed: Jan. 20, 2016

(65) Prior Publication Data

US 2016/0232674 A1    Aug. 11, 2016

(30) Foreign Application Priority Data

Feb. 10, 2015  (JP) ................................. 2015-024010

(51) Int. Cl.
*G06K 9/00* (2006.01)
*G06F 3/01* (2006.01)

(52) U.S. Cl.
CPC ......... *G06K 9/00389* (2013.01); *G06F 3/017* (2013.01); *G06K 9/00355* (2013.01)

(58) Field of Classification Search
None
See application file for complete search history.

(56) References Cited

U.S. PATENT DOCUMENTS 5,594,469 A * 1/1997 Freeman .............. G05B 19/106
                                                345/157
5,670,987 A * 9/1997 Doi ........................ B25J 9/1692
                                                345/156
6,128,003 A * 10/2000 Smith ................. G06K 9/00355
                                                345/156

(Continued)

FOREIGN PATENT DOCUMENTS

EP     0 837 418    4/1998
EP     2 463 751    6/2012

(Continued)

OTHER PUBLICATIONS

Ogasawara et al., U.S. Appl. No. 15/001,517, filed Jan. 20, 2016.

(Continued)

*Primary Examiner* — Avinash Yentrapati
(74) *Attorney, Agent, or Firm* — Nixon & Vanderhye PC

(57) ABSTRACT

An example information processing system includes a camera. The information processing system calculates, based on a camera image obtained by the camera, a position or a direction of an object (e.g., a hand of a user) included in the camera image. The information processing system instructs an output device to produce an output in accordance with the position or the direction of the object. The information processing system displays, on a display device, a guide image including a range image representing a range and an indicator image whose position or direction changes in accordance with a change in the output within the range.

14 Claims, 28 Drawing Sheets

(56) References Cited

U.S. PATENT DOCUMENTS

| | | | | |
|---|---|---|---|---|
| 6,144,366 | A * | 11/2000 | Numazaki | G06F 3/011 345/156 |
| 6,215,890 | B1 * | 4/2001 | Matsuo | G06F 3/017 348/E13.014 |
| 6,788,809 | B1 * | 9/2004 | Grzeszczuk | G06F 3/017 345/419 |
| 8,643,628 | B1 * | 2/2014 | Eriksson | G06F 1/169 345/173 |
| 8,843,857 | B2 * | 9/2014 | Berkes | G06F 3/011 715/763 |
| 9,268,484 | B2 * | 2/2016 | Zhang | G06F 3/04883 |
| 2004/0233238 | A1 * | 11/2004 | Landesmaki | G06F 3/0482 715/810 |
| 2006/0010400 | A1 * | 1/2006 | Dehlin | G06F 3/0354 715/856 |
| 2008/0089587 | A1 * | 4/2008 | Kim | G06F 3/017 382/190 |
| 2009/0027337 | A1 * | 1/2009 | Hildreth | G06F 3/011 345/158 |
| 2009/0031240 | A1 * | 1/2009 | Hildreth | G06F 3/011 715/772 |
| 2010/0235786 | A1 * | 9/2010 | Maizels | G06F 3/011 715/810 |
| 2011/0119640 | A1 * | 5/2011 | Berkes | G06F 3/011 715/863 |
| 2011/0248999 | A1 | 10/2011 | Aoyagi | |
| 2011/0310005 | A1 * | 12/2011 | Chen | G06F 1/3203 345/156 |
| 2012/0056989 | A1 * | 3/2012 | Izumi | H04N 13/0014 348/46 |
| 2012/0146903 | A1 * | 6/2012 | Arihara | G06F 3/011 345/158 |
| 2012/0174039 | A1 * | 7/2012 | Rhoads | H04N 21/4312 715/854 |
| 2012/0188279 | A1 * | 7/2012 | Demaine | A63F 13/10 345/633 |
| 2012/0219227 | A1 * | 8/2012 | Osako | G06K 9/4604 382/199 |
| 2012/0272179 | A1 * | 10/2012 | Stafford | G06F 3/012 715/781 |
| 2013/0120280 | A1 * | 5/2013 | Kukulski | G06F 3/04883 345/173 |
| 2013/0145327 | A1 * | 6/2013 | Rinearson | G06F 3/017 715/863 |
| 2013/0165227 | A1 | 6/2013 | Koizumi | |
| 2013/0198690 | A1 * | 8/2013 | Barsoum | G06F 3/017 715/822 |
| 2014/0068475 | A1 * | 3/2014 | Li | G06F 17/30861 715/765 |
| 2014/0101578 | A1 * | 4/2014 | Kwak | G06F 3/017 715/761 |
| 2014/0115533 | A1 * | 4/2014 | Suzuki | G06F 3/0488 715/799 |
| 2014/0237432 | A1 * | 8/2014 | Geurts | G06F 3/005 715/863 |
| 2014/0267130 | A1 * | 9/2014 | Hwang | G06F 3/04883 345/174 |
| 2014/0376773 | A1 * | 12/2014 | Holz | G06K 9/00342 382/103 |
| 2015/0153833 | A1 * | 6/2015 | Pinault | G06F 3/011 345/156 |
| 2016/0232674 | A1 * | 8/2016 | Tanaka | G06F 3/017 |

FOREIGN PATENT DOCUMENTS

| | | |
|---|---|---|
| JP | 2006-271663 | 10/2006 |
| JP | 2011-154699 | 8/2011 |

OTHER PUBLICATIONS

Kitazono, et al., U.S. Appl. No. 15/001,807, filed Jan. 20, 2016.
Aoyagi, U.S. Appl. No. 14/961,210, filed Dec. 7, 2015.
European Search Report dated Jun. 21, 2016 issued in corresponding European Application No. 15197474.8 (10 pgs.).
Lahamy, Hervé, and Derek Litchi. "Real-time hand gesture recognition using range cameras." *Proceedings of the Canadian Geomatics Conference,* Calgary, Canada. 2010.
Office Action dated Jun. 27, 2017 issued in co-pending U.S. Appl. No. 14/961,210 of Aoyagi, filed Dec. 7, 2015 (13 pages).
U.S. Appl. No. 15/001,517, filed Jan. 20, 2016, Information Processing Device, Storage Medium Storing Information Processing Program, Information Processing System, and Information Processing Method.
U.S. Appl. No. 15/001,807, filed Jan. 20, 2016, Information Processing Device, Storage Medium Storing Information Processing Program, Information Processing System, and Information Processing Method.
U.S. Appl. No. 14/961,210, filed Dec. 7, 2015, Information Processing Device, Storage Medium Storing Information Processing Program, Information Processing System, and Information Processing Method.
Ogasawara, Office Action dated Apr. 7, 2017, issued in co-pending U.S. Appl. No. 15/001,517, filed Jan. 20, 2016 (10 pages).

* cited by examiner

INFORMATION PROCESSING DEVICE, STORAGE MEDIUM STORING INFORMATION PROCESSING PROGRAM, INFORMATION PROCESSING SYSTEM, AND INFORMATION PROCESSING METHOD

CROSS REFERENCE TO RELATED APPLICATION

The disclosure of Japanese Patent Application No. 2015-24010, filed on Feb. 10, 2015, is herein incorporated by reference.

FIELD

The present technique relates to an information processing device, a storage medium storing an information processing program, an information processing system, and an information processing method for performing processes based on a captured image obtained by an image-capturing device.

BACKGROUND AND SUMMARY

There are conventional portable game devices including a display and a camera (image-capturing device) provided on the back side of the display. These game devices obtain a captured image in response to a shutter operation by the user to analyze a characteristic portion of the captured image obtained and to display, on the display, an image obtained by superimposing a virtual character over the captured image based on the analysis results.

Where captured images used as an input, there is a demand for improving the controllability.

Therefore, the present application discloses an information processing device, a storage medium storing an information processing program, an information processing system, and an information processing method, with which it is possible to improve the controllability.

(1)
An example information processing device described herein includes an image-capturing device, a position calculation unit, an output control unit and a guide display unit. The position calculation unit calculates, based on a captured image obtained by the image-capturing device, a position or a direction of an object included in the captured image. The output control unit instructs an output device to produce an output in accordance with the position or the direction of the object. The guide display unit displays, on a display device, a guide image including a range image representing a range and an indicator image whose position or direction changes in accordance with a change in the output within the range.

(2)
The image-capturing device may capture an image in a side surface direction of a housing of the information processing system.

(3)
The indicator image may be an image representing the object.

(4)
The guide display unit may display, on the display device, a guide image including a predetermined device reference image so that a positional relationship between the indicator image and the predetermined device reference image corresponds to a positional relationship between the object and the image-capturing device.

(5)
When a position of the object cannot be calculated, the guide display unit may change a display mode of the guide image, as compared with that when the position of the object is calculated.

(6)
When the position of the object calculated by the position calculation unit is further away toward an un-calculatable area from a predetermined reference position by a predetermined distance or more, the guide display unit may change a display mode of the guide image, as compared with that when the calculated position is within the predetermined distance.

(7)
The position calculation unit may calculate, based on the captured image, a position of the object with respect to an image-capturing direction of the image-capturing device.

(8)
The output control unit may control the output so that the output is in accordance with a relationship between the position of the object calculated by the position calculation unit and a predetermined reference position. The guide display unit may display, on the display device, a guide image including a process reference image placed at a position corresponding to the reference position within the range represented by the range image.

(9)
Another example information processing device described herein includes a detection unit, a calculation unit, an output control unit and a guide display unit. The detection unit detects an object present at a position away from the information processing device. The calculation unit calculates the position or the direction of the object based on the detection result of the detection unit. The output control unit instructs an output device to produce an output in accordance with the position or the direction of the object. The guide display unit displays, on a display device, a guide image including a range image representing a range and an indicator image whose position or direction changes in accordance with a change in the output within the range.

The present specification also discloses a storage medium storing an information processing program instructing a computer of an information processing system to function as the various units of the information processing device set forth above. Note that the computer of the information processing system may be a computer of information processing device, or a computer of another information processing device separate from the information processing device. The present specification also discloses an information processing system including the various units of the information processing device set forth above. The present specification also discloses an information processing method to be performed on the information processing system set forth above.

With the information processing device, the storage medium storing an information processing program, the information processing system, and the information processing method, it is possible to improve the controllability.

These and other objects, features, aspects and advantages will become more apparent from the following detailed description when taken in conjunction with the accompanying drawings.

DETAILED DESCRIPTION OF NON-LIMITING EXAMPLE EMBODIMENTS

First Embodiment

An information processing device, an information processing system, an information process program and an information processing method of the present embodiment will now be described. An information processing device of the first embodiment captures an image of an object, such as a hand of a user, by means of a camera (an infrared camera) so as to determine the action of the user based on the captured image.

[1. Configuration of Portable Device]

Figure 1:
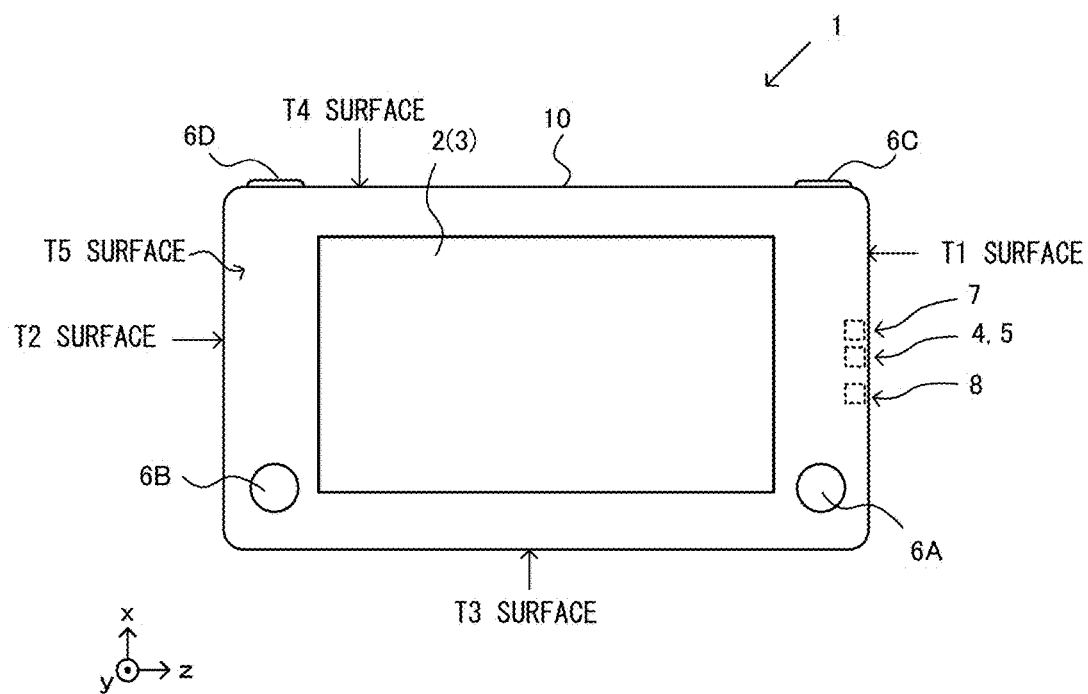
FIG. 1 is a front view showing a non-limiting example portable device of the present embodiment.
Figure 2:
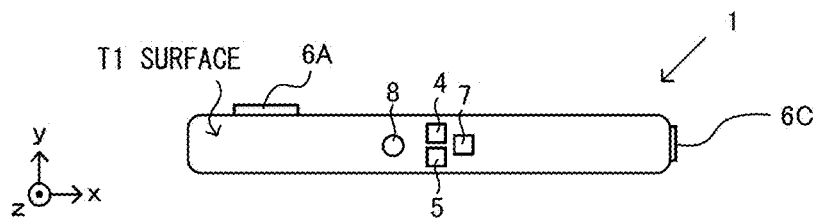
FIG. 2 is a right side view showing a non-limiting example portable device.
Figure 3:
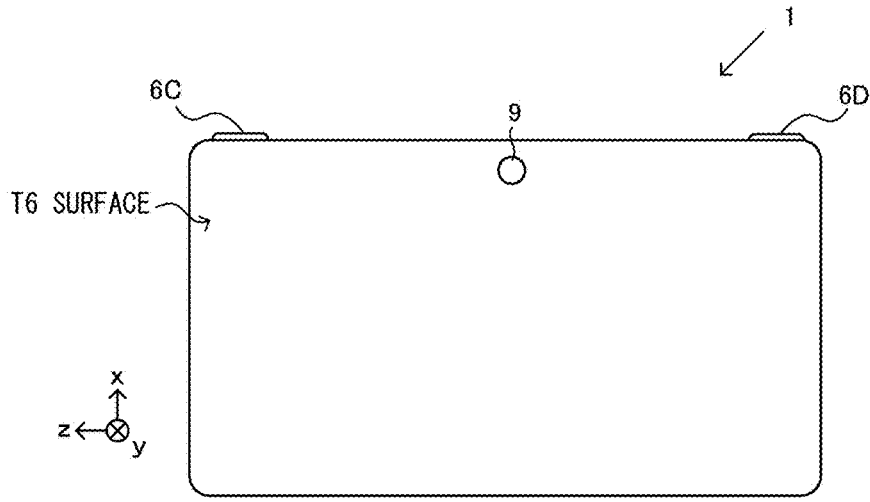
FIG. 3 is a back view showing a non-limiting example portable device.

First, referring to FIG. 1 to FIG. 5, an example of a configuration of a portable device, which is an example of the information processing device, will be described. FIG. 1 is a front view showing an example of a portable device of the first embodiment. FIG. 2 is a right side view showing an example of a portable device. FIG. 3 is a back view showing an example of a portable device. In the first embodiment, a portable device 1 is a portable information processing device that can be held in a hand and operated by a user. For example, the portable device 1 may be a hand-held device such as a portable game device, a portable telephone, a smartphone, a tablet terminal or a camera, or may be a terminal that can be worn by a user such as a wristwatch-shaped terminal.

As shown in FIG. 1, the portable device 1 includes a display 2, a touch panel 3, an infrared camera 4, a distance measuring sensor 5, input buttons 6 (6A to 6D), an illuminating section 7 and a projector 8, which are accommodated in a housing 10. The housing 10 (the portable device 1) has a plate-like shape, and is sized so that it can be held by a user with one hand or both hands. The housing 10 has an elongate shape in a landscape position.

For example, the display 2 may be a liquid crystal display device, an organic EL display device, or the like, or may by any other suitable display device. The screen of the display 2 is provided so as to be exposed on the front surface (T5 surface) of the housing 10. The touch panel 3 is provided on the screen of the display 2 for detecting the position at which the screen has been touched by a user. The touch panel 3 may be a touch panel capable of one-point detection or a touch panel capable of multi-point detection, and may be of any suitable type such as capacitive or resistive, for example.

The input buttons 6A to 6D each receive an input (pressing of a button) by a user. The input buttons 6A to 6D are each provided at such a position that it can be reached by a finger of a user when the user holds the opposing sides of the portable device 1. Specifically, the input buttons 6A and 6C are located so that they can be reached by fingers of the right hand when the user holds the portable device 1 with the right hand, wherein the input button 6A is provided at such a position that it can be reached by the thumb of the right hand, and the input button 6C is provided at such a position that it can be reached by the index finger or the middle finger of the right hand. The input buttons 6B and 6D are located so that they can be reached by fingers of the left hand when the user holds the portable device 1 with the left hand, wherein the input button 6B is provided at such a position that it can be reached by the thumb of the left hand, and the input button 6D is provided at such a position that it can be reached by the index finger or the middle finger of the left hand. As shown in FIG. 1, the input buttons 6A and 6B are provided on the front surface (T5 surface) of the housing 10, and the input buttons 6C and 6D are provided on the top surface (T4 surface) of the housing 10. Note that input sections for receiving inputs from a user may include, in addition to the input buttons 6A to 6D, a cross-shaped key, an analog stick, or the like, for direction inputs.

The infrared camera 4 includes a lens, and a sensor capable of sensing light (infrared rays; specifically, near infrared rays). The sensor of the infrared camera 4 is an image sensor in which elements capable of sensing infrared rays are arranged in a matrix, and the elements of the image sensor receive and convert infrared rays into electric signals, outputting a two-dimensional infrared image.

The distance measuring sensor 5 emits light (e.g., infrared light) from a light source provided in the distance measuring sensor 5 and receives the light having been reflected off an object by means of a light-receiving element, thereby measuring the distance to the object. The distance measuring sensor 5 may be of any type, including a triangulation type and a TOF (Time Of Flight) type. The light source of the distance measuring sensor 5 may be an LED, a laser diode, or the like, emitting infrared light in a particular direction.

The illuminating section 7 outputs infrared rays at a predetermined time interval (e.g., an interval of 1/60 sec). The illuminating section 7 outputs infrared rays in sync with the timing with which the infrared camera 4 captures images. The illuminating section 7 outputs infrared rays onto a predetermined range in the right side surface direction of the portable device 1. Infrared rays output by the illuminating section 7 are reflected by an object, and the reflected infrared rays are received by the infrared camera 4, thereby obtaining an image of the infrared rays. Note that the illuminating section 7 may be used for capturing an infrared image by the infrared camera 4 and for measuring the distance by the distance measuring sensor 5. That is, the infrared light from the illuminating section 7 may be used both for capturing an image by means of the infrared camera 4 and for measuring the distance by means of the distance measuring sensor 5.

The projector 8 includes a light source for emitting visible light, and projects text, an image, etc., onto a projection plane (a screen or the hand of a user as will be described later) by using light from the light source.

The infrared camera 4, the distance measuring sensor 5, the illuminating section 7 and the projector 8 are provided on a side surface of the housing 10 (e.g., the right side surface: T1 surface). Specifically, the image-capturing direction (optical axis) of the infrared camera 4 is oriented vertical to the right side surface. The detecting direction of the distance measuring sensor 5 and the direction in which the projector 8 outputs light are also vertical to the right side surface. That is, when a user holds the portable device 1 with the left hand, the infrared camera 4 captures an image of the space in the right side surface direction of the portable device 1, and the distance measuring sensor 5 measures the distance to an object existing in the space in the right side surface direction of the portable device 1. The projector 8 projects an image, or the like, by outputting visible light in the same direction as the infrared camera 4 and the distance measuring sensor 5.

An outside camera 9 is provided on the back surface (T6 surface) of the portable device 1 (FIG. 3). The outside camera 9 is typically capable of capturing an image in the direction vertical to the image-capturing direction of the infrared camera 4, and is capable of capturing an image in the direction vertical to the back surface. The outside camera 9 includes a lens, and an image sensor capable of sensing visible light. The outside camera 9 captures an image of the space in the back surface direction, obtaining a color image (RGB image). Note that a camera may be provided on the front surface in addition to the outside camera 9 on the back surface, or a camera may be provided on the front surface (the surface on which the screen of the display 2 is provided) without providing the outside camera 9 on the back surface.

Figure 4:
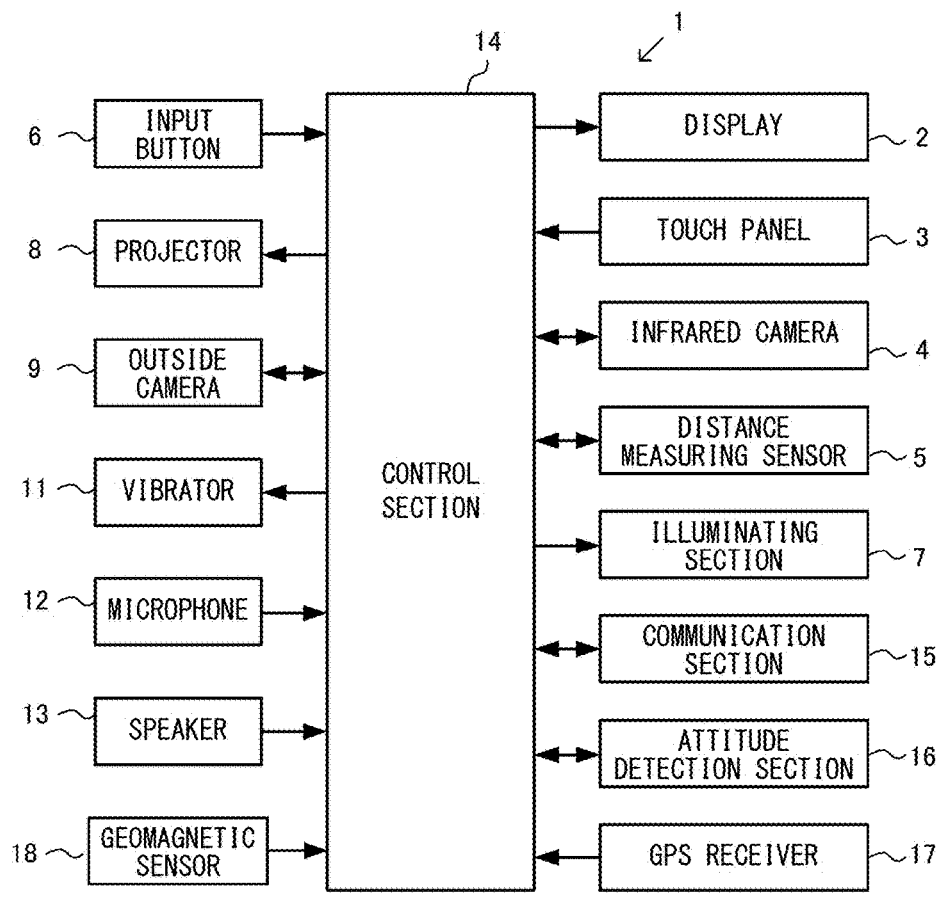
FIG. 4 is a block diagram showing an internal configuration of a non-limiting example portable device.

FIG. 4 is a block diagram showing an example of an internal configuration of the portable device 1. As shown in FIG. 4, in addition to the various sections mentioned above, the portable device 1 includes a vibrator 11, a microphone 12, a speaker 13, a control section 14, a communication section 15, an attitude detection section 16, a GPS receiver 17 and a geomagnetic sensor 18. The portable device 1 also includes a battery (not shown), and receives power supply from the battery. These sections are accommodated in the housing 10.

The control section 14 is connected to, and controls, various sections including the display 2, the touch panel 3, the infrared camera 4, the distance measuring sensor 5, the input button 6, the illuminating section 7, the projector 8, the vibrator 11, the microphone 12, the speaker 13, the communication section 15, the attitude detection section 16, the GPS receiver 17 and the geomagnetic sensor 18.

Specifically, the control section 14 includes a CPU, a memory, etc., for performing a predetermined process based on a predetermined program (e.g., an application program for performing game processes, image processes, and various arithmetic operations) stored in a storage device (not shown) (e.g., a non-volatile memory or a hard disk) provided in the portable device 1. For example, the control section 14 may obtain and analyze an image from the infrared camera 4, calculate the distance to an object based on the signal from the distance measuring sensor 5, or perform a process in accordance with input signals from the touch panel 3 and the input button 6. Then, the control section 14 generates an image based on the results of the predetermined process, and outputs the image on the display 2. Note that the program for performing the predetermined process may be downloaded from outside via the communication section 15.

The vibrator 11 operates based on an instruction from the control section 14 and vibrates the entire portable device 1. The vibrator 11 is provided at a predetermined position such that vibrations are easily transmitted to the hand of a user (e.g., in the central portion, or at a position shifted left or right therefrom, inside the housing 10).

The microphone 12 and the speaker 13 are used for inputting/outputting sounds. The communication section 15 is used for communicating with other devices by a predetermined communication scheme (e.g., wireless LAN, etc.). The attitude detection section 16 is, for example, an acceleration sensor or an angular velocity sensor for detecting the attitude of the portable device 1.

The GPS receiver 17 receives a signal from a GPS (Global Positioning System) satellite, and the portable device 1 can calculate the position of the portable device 1 itself by receiving the signal. For example, when a predetermined operation is performed at a particular position (e.g., a gesture input or a button input using the infrared camera 4, shaking the portable device 1, etc., to be described later), the portable device 1 may display an object associated with the particular position. For example, where a game is played on the portable device 1, and the portable device 1 is at a particular position, an object associated with the particular position may appear in the game.

The geomagnetic sensor 18 is a sensor capable of detecting the direction and the magnitude of a magnetic field. For example, based on the detection result of the geomagnetic sensor 18, the portable device 1 may determine whether it is facing a particular azimuthal direction, and the portable device 1 may display an object when a predetermined operation (e.g., a gesture input mentioned above) is performed in a particular azimuthal direction. For example, where a game is played on the portable device 1, an object associated with a particular azimuthal direction may appear in the game. The portable device 1 may combine together GPS information obtained by the GPS receiver 17 and azimuthal direction information obtained by the geomagnetic sensor. For example, if the portable device 1 is at a particular position and is facing a particular azimuthal direction, the portable device 1 may display an object associated with the particular position and the particular azimuthal direction, or such an object may appear in the game.

Figure 5:
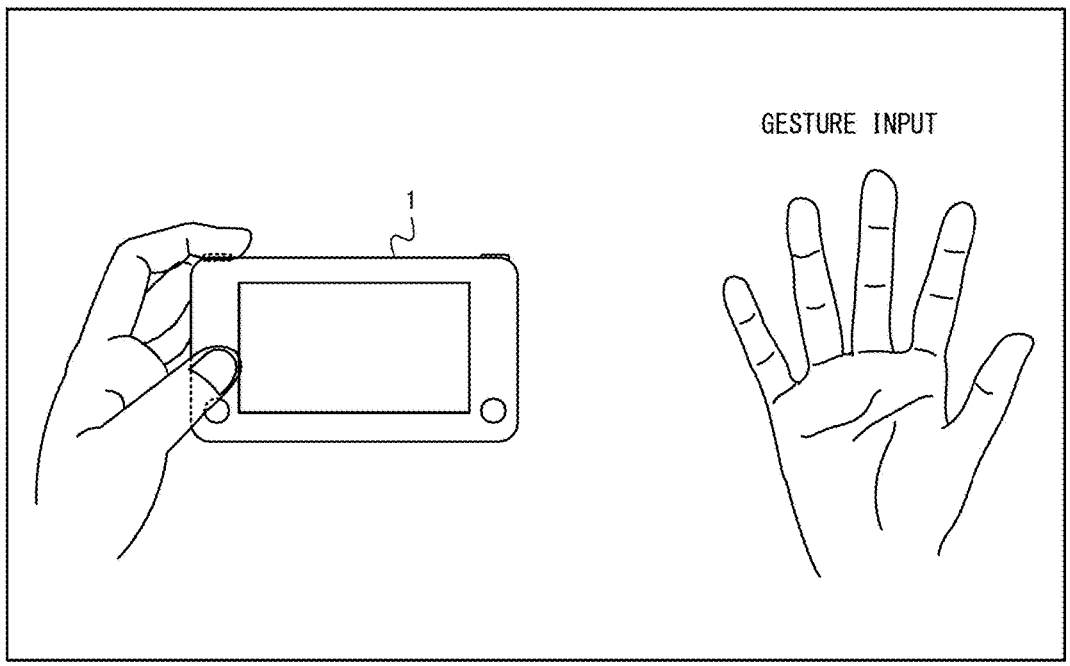
FIG. 5 shows how a non-limiting example portable device is used.

FIG. 5 shows an example of how the portable device 1 is used. As shown in FIG. 5, a user can hold the portable device 1 with one hand and make gesture inputs using the other hand. Note that a gesture input may be any input made with an operation object that is operated (moved) by a user. An operation object may be the body of the user (which may be the whole body or a part of the body such as a hand or the face), an object held by the user, or may be both the body and an object. The portable device 1 may recognize the shape of the operation object as a gesture input, may recognize the movement of the operation object as a gesture input, or may recognize a combination of the shape and the movement as a gesture input. For example, a user may make a gesture input by using the shape, the movement, the position (with respect to the portable device 1), the orientation (attitude), etc., of the hand.

In the first embodiment, the portable device 1 captures an image (infrared image) by means of the infrared camera 4, and determines a gesture input based on the captured image. Specifically, when a captured image is obtained from the infrared camera 4, the portable device 1 calculates the shape, the position, and/or the orientation (attitude) of the object based on the captured image obtained. Note that based on a plurality of captured images obtained through repetition, the portable device 1 may calculate the movement of the object (the change of shape, the moving direction, the moving speed, etc.). The portable device 1 determines a gesture input based on these calculation results.

[2. Outline of Process Performed in Portable Device 1]

Next, a process performed by the portable device 1 in the first embodiment will be outlined. Referring to FIG. 6 to FIG. 10, a process will be described below, in which the portable device 1 detects a hand of a user by means of an infrared camera and calculates the position and the shape of the hand.

Note that the first embodiment (and similarly in the second to fourth embodiments to be described below) assumes a case where a user makes a gesture input by using a hand, and the portable device 1 detects the hand of the user and calculates the position and the shape thereof. Note however that the object to be detected by the portable device 1 may be any suitable object. For example, in other embodiments, the portable device 1 may detect a predetermined operation member (e.g., a pen) held by a user.

Figure 6:
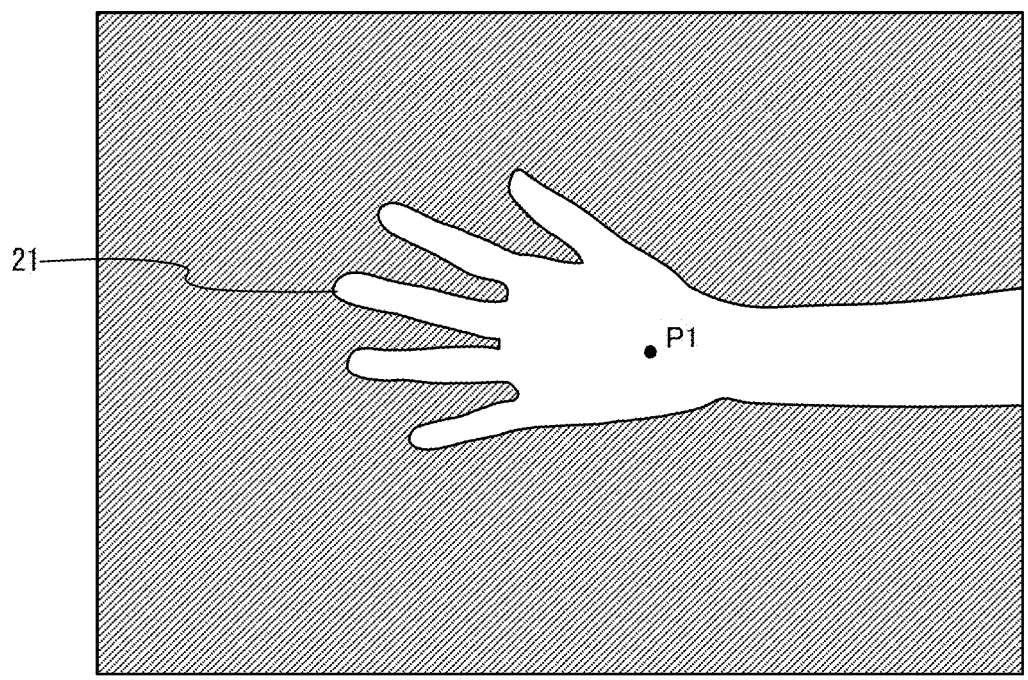
FIG. 6 shows a non-limiting example captured image.

FIG. 6 shows an example of a captured image. In the first embodiment, a captured image (infrared image) captured by the infrared camera 4 contains information on the brightness value of each pixel (i.e., a value representing the brightness of each pixel of a captured image). Now, infrared rays are output from the illuminating section 7 onto an object (a hand of a user in FIG. 6) located in the image-capturing range of the infrared camera 4, and the reflected light is detected by the infrared camera 4. Therefore, the brightness value is higher in the area of the object in the captured image. For example, if a user places a hand near the infrared camera 4 (e.g., in a range of 40 cm or less), a hand area 21 is included in the captured image as shown in FIG. 6. Where the palm portion is located close to the infrared camera 4 with the arm portion being located gradually away from the infrared camera 4, the brightness value of the arm portion in the hand area 21 gradually lowers in the direction away from the palm portion.

Note that it is assumed in the first embodiment that the brightness value of each pixel in the captured image is represented in multiple steps (e.g., 256 steps). Note however that in FIG. 6, for ease of understanding, the hatched area represents the portion where the brightness value is relatively low and the unhatched area (the hand area 21) represents the portion where the brightness is relatively high.

In the first embodiment, the portable device 1 calculates the hand position based on the captured image. In the first embodiment, the portable device 1 calculates the three-dimensional position of the hand, i.e., the position in the two-dimensional direction (the x-axis direction and the y-axis direction shown in the figures) perpendicular to the image-capturing direction of the infrared camera 4, and the position with respect to the image-capturing direction of the infrared camera 4 (the z-axis direction shown in the figures).

(Calculating Position with Respect to x-Axis Direction and y-Axis Direction)

The position in the two-dimensional direction perpendicular to the image-capturing direction of the infrared camera 4 is calculated by using the center-of-gravity position regarding the brightness value of the captured image (the position P1 shown in FIG. 6). Now, the center-of-gravity position in the captured image refers to the center-of-gravity position of the entire captured image obtained with the brightness value of each pixel of the captured image being used as a weight. The center-of-gravity position can be obtained by calculating, for each pixel, a two-dimensional value obtained by multiplying two-dimensional coordinates representing the position of the pixel by the brightness value of the pixel, and then dividing the total sum of the calculated two-dimensional values by the total sum of the brightness values of the pixels. Note that if the captured image includes no area, other than the hand area 21, where the brightness value is high and the area is large (i.e., if no object other than the hand is captured by the infrared camera 4), the center-of-gravity position will be inside the hand area 21.

Figure 7:
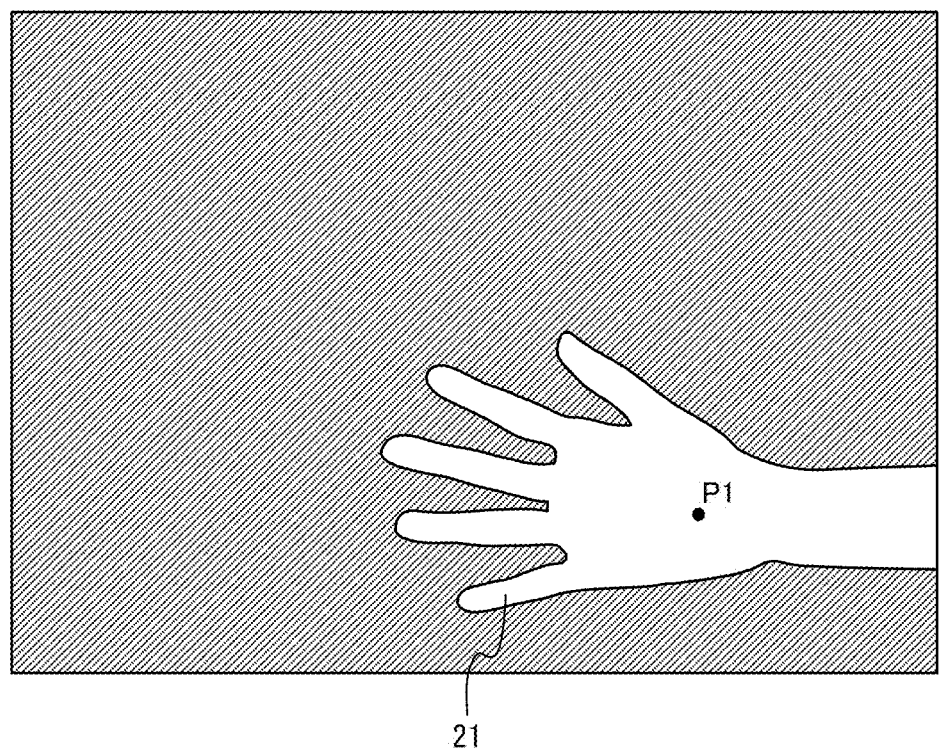
FIG. 7 shows an example of a captured image where the hand position has moved from the state shown in FIG. 6.

FIG. 7 shows an example of a captured image where the hand position has moved from the state shown in FIG. 6. As shown in FIG. 7, when the hand area 21 in the captured image moves, the center-of-gravity position moves accordingly. Therefore, it can be said that the center-of-gravity position represents the hand position, and can be used as the hand position. That is, the portable device 1 can detect the hand position with respect to the two-dimensional direction by calculating the center-of-gravity position.

Note that the portable device 1 is not limited to the configuration where the center-of-gravity position itself is used as the hand position, but any position that is determined based on the center-of-gravity position may be used as the hand position. For example, the hand position may be calculated as a position obtained by moving the center-of-gravity position in a predetermined moving direction by a predetermined moving amount. The moving direction and/or the moving amount may be fixed or may be variable. For example, the moving direction and/or the moving amount may be set variably in accordance with at least one of the shape of the hand, the hand position with respect to the image-capturing direction, and the brightness of the entire captured image. That is, the portable device 1 may determine the method for calculating the hand position from the center-of-gravity position in accordance with at least one of the shape of the hand, the hand position with respect to the image-capturing direction, and the brightness of the entire captured image. Thus, it is possible to more accurately calculate the hand position. Note that the method for calculating the shape of the hand, the hand position with respect to the image-capturing direction and the brightness of the entire captured image will be described later.

As described above, in the first embodiment, the portable device 1 calculates the hand position using the center-of-gravity position of the captured image without specifying the hand area 21 in the captured image. Then, it is possible to calculate the hand position by a simple method without the need for an image recognition process for specifying the hand area (the outline of the hand). In other words, it is possible to reduce the process load of the process of calculating the hand position, and it is possible to increase the speed of the process.

Note that the area for which the center-of-gravity position is calculated does not need to be the area of the entire captured image, but may be any area that is set independently of the hand area 21. For example, the portable device 1 may calculate the center-of-gravity position for an inside area that is at a predetermined distance from the end portion (the perimeter) of the captured image. Then, since the hand position is calculated when the hand area 21 is present in the inside area, gesture inputs are accepted only when the hand area 21 is present in the inside area.

(Calculating Position with Respect to z-Axis Direction)

In the first embodiment, the portable device 1 calculates the position with respect to the image-capturing direction (the z-axis direction) based on the captured image. The position with respect to the image-capturing direction (the distance from the infrared camera 4) is calculated based on the brightness of the (entire) captured image. Specifically, the portable device 1 calculates the average brightness value among pixels of the captured image, and calculates the distance based on the average value.

Figure 8:
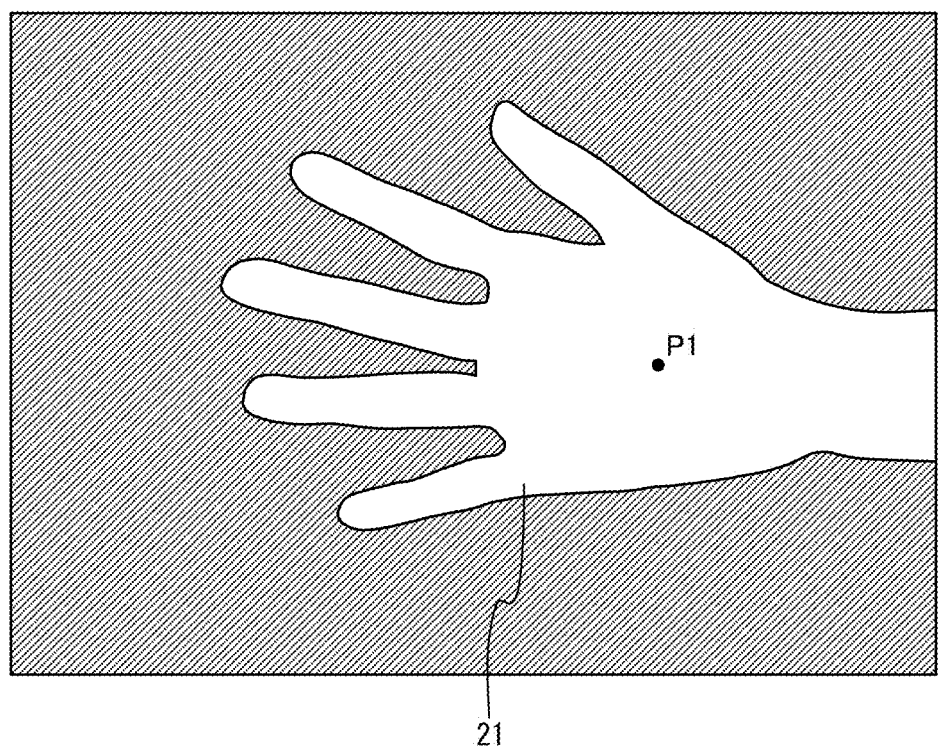
FIG. 8 shows another example of a captured image where the hand position has moved from the state shown in FIG. 6.

FIG. 8 shows another example of a captured image where the hand position has moved from the state shown in FIG. 6. The captured image shown in FIG. 8 shows a case where the hand has moved toward the infrared camera 4, as compared with the captured image shown in FIG. 6. In such a case, since the proportion of the area of the captured image occupied by the hand area 21 is larger as compared with FIG. 6, the brightness of the captured image (the average value described above) is higher than that of FIG. 6. Thus, the brightness of the entire captured image varies depending on the distance from the infrared camera 4 to the hand. Thus, the portable device 1 is capable of calculating the hand distance based on the brightness of the captured image.

The specific method for calculating the distance based on the brightness of the captured image may be any method. For example, in the first embodiment, the portable device 1 may store, in advance, information representing the correlation between the brightness and the distance (which may be a table or may be a function), and calculate the distance based on the correlation. Note that in other embodiments, the portable device 1 may calculate the distance based on the position at a reference point in time (e.g., a point in time at which control has started to obtain the captured image) (i.e., a relative position with respect to the position at the reference point in time) based on the amount of change in the brightness of the captured image at the reference point in time.

Note that the portable device 1 can calculate the two-dimensional position of the hand from the center-of-gravity position described above, irrespective of the hand distance. Note however that the positional relationship between the center-of-gravity position and the hand area 21 may vary depending on the distance described above. Therefore, the portable device 1 may change the process (method) for specifying the hand position from the center-of-gravity position in accordance with the distance described above. For example, where the hand position is calculated as a position obtained by moving the center-of-gravity position in a predetermined moving direction by a predetermined moving amount, the portable device 1 may change the moving direction and/or the moving amount depending on the distance described above.

As described above, in the first embodiment, the portable device 1 calculates the distance of the hand from the infrared camera 4 by using the brightness of the captured image without specifying the hand area 21 in the captured image. Then, there is no need for the image recognition process for specifying the hand area 21, and it is possible to calculate the hand distance with a simple method. In other words, it is possible to reduce the process load of the process for calculating the hand distance, and it is possible to increase the speed of the process.

Note that the area for which the brightness of the captured image (the average value described above) is calculated does not need to be an area of the entire captured image, but may be any area that is set independently of the hand area 21. For example, as with the calculation of the center-of-gravity position, the portable device 1 may calculate the average value described above for an inside area that is at a predetermined distance from the end portion (perimeter) of the captured image.

(Specifying Shape of Hand)

In the first embodiment, the portable device 1 calculates the shape of the hand based on the captured image. In the first embodiment, the portable device 1 specifies the shape of the hand to be either an open-hand shape (the open-palm shape) or a closed-hand shape (the closed-fist shape).

Figure 9:
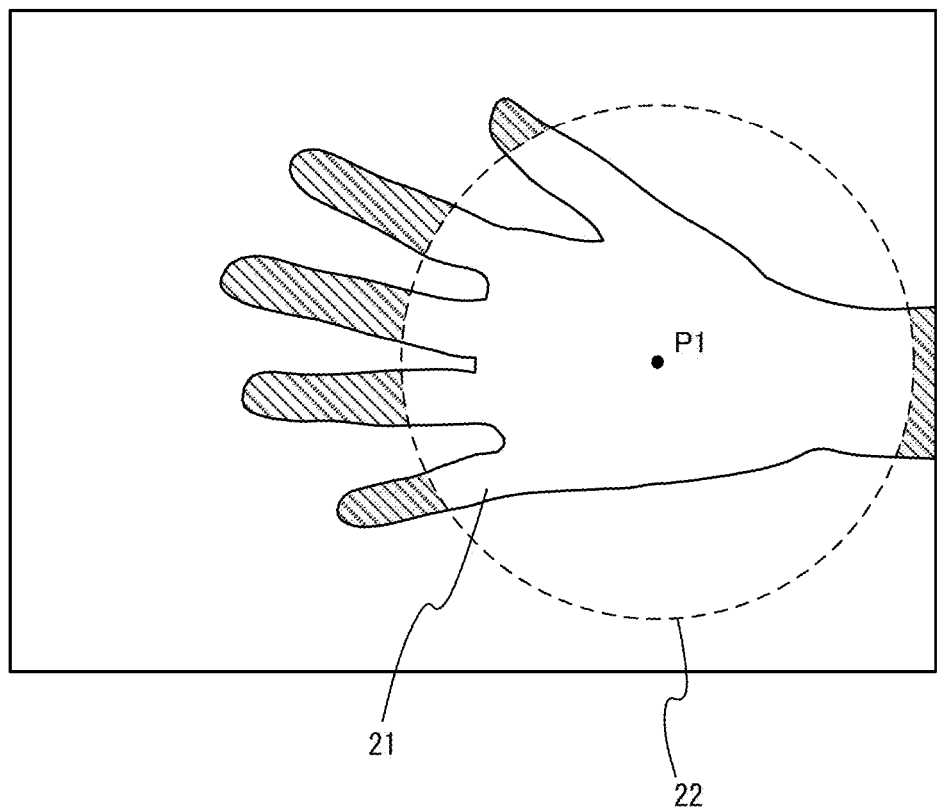
FIG. 9 shows an example of a captured image where the hand is in an open shape.

FIG. 9 shows an example of a captured image where the hand is in an open-hand shape. Note that in FIG. 9, for ease of understanding, the area of a lower brightness value is not hatched (as opposed to FIG. 6, etc.). In the first embodiment, the portable device 1 sets, on the captured image, a determination range 22 for determining the shape of the hand, as shown in FIG. 9. The determination range 22 is set based on the center-of-gravity position P1 described above. Specifically, in the first embodiment, the portable device 1 sets the determination range 22 as a circular area having a radius of a predetermined length and centered about the center-of-gravity position P1. Note that the method for setting the determination range 22 based on the center-of-gravity position may be any method. For example, in other embodiments, where a position different from the center-of-gravity position is calculated as the hand position, the portable device 1 may set the determination range 22 as a circular area centered about the hand position.

There is no limitation on the size and the shape of the determination range 22. In the first embodiment, the size of the determination range 22 (the diameter of the circular area) is set to be larger than the hand area in a closed position and smaller than the hand area in an open position. In other words, the position and the size of the determination range are set so that the hand area is included inside the determination range in the closed-hand position and that portions of the hand area (portions of the fingers) lie outside the determination range in the open-hand position. Therefore, the size of the determination range 22 may be set to vary depending on the distance of the hand from the infrared camera 4 (in other words, the brightness of the captured image).

Figure 10:
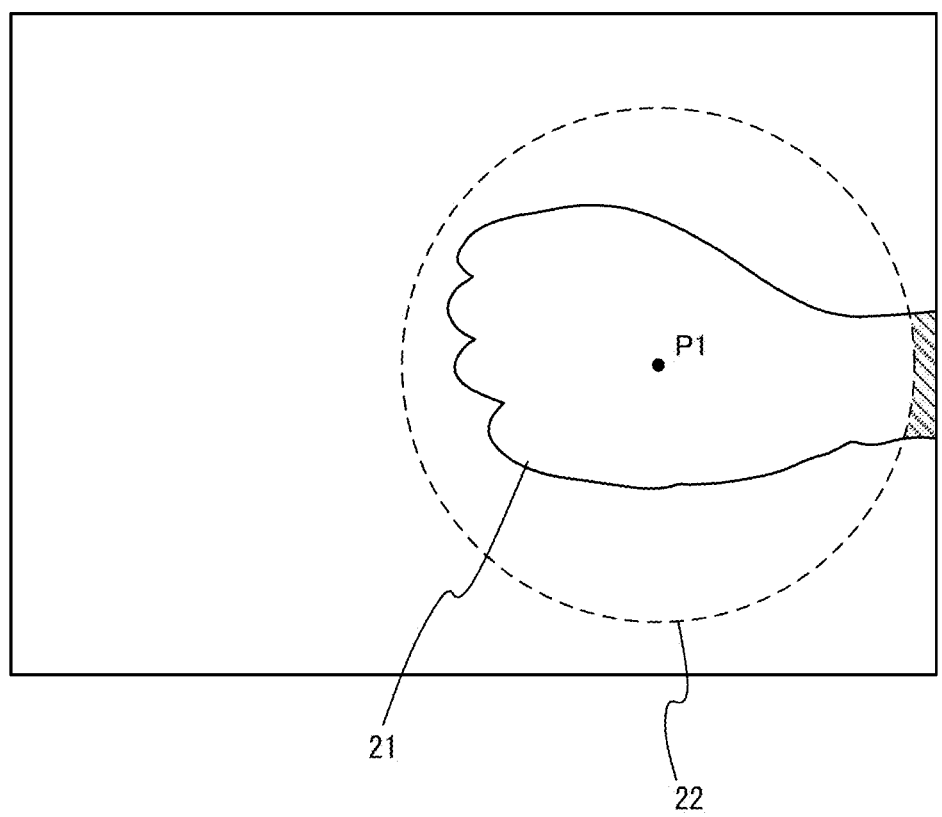
FIG. 10 shows an example of a captured image where the hand is in a closed shape.

When the hand is in an open shape, as shown in FIG. 9, finger areas and a wrist (arm) area (the hatched areas shown in FIG. 9) of the hand area 21 lie outside the determination range 22. On the other hand, FIG. 10 shows an example of a captured image where the hand is in a closed shape. When the hand is in a closed shape as shown in FIG. 10, only the wrist area of the hand area 21 lies outside the determination range 22. Thus, the shape of the hand can be determined based on the relationship between the determination range 22 and the hand area.

Specifically, the portable device 1 determines whether the hand is in an open shape or a closed shape in accordance with the number of areas of the hand area 21 that are lying outside the determination range 22 (referred to as "outside areas"). Note that an outside area can be detected as an area that is lying outside the determination range 22 and has a relatively high brightness value (e.g., an area where the brightness value is greater than or equal to a predetermined value). In the first embodiment, the portable device 1 determines that the hand is in an open shape when the number of the outside areas is five or more, and determines that the hand is in a closed shape when the number of the outside areas is one or less. Note that the expression "five or more" (as opposed to "six") and the expression "one or less" (as opposed to "one") are used so that the shape of the hand can be determined even if one of the outside areas (e.g., the wrist area) is not detected due to a low brightness value.

Note that in other embodiments, the portable device 1 may determine the shape of the hand to be one selected from among three or more different shapes. For example, based on the number of outside areas, the shape of the hand can be determined to be the closed-fist shape, the closed-fist shape, or the open-palm shape. Specifically, the portable device 1 determines that the hand is in an open shape (the open-palm shape) when the number of areas lying outside the determination range 22 is five or more, determines that the hand is in a shape with two fingers extended (the closed-fist shape) when the number of such areas is two or three, and determines that the hand is in a closed shape (the closed-fist shape) when the number of such areas is one or less.

In other embodiments, the portable device 1 may set a plurality of determination ranges. Then, the portable device 1 may determine the shape of the hand based on the relationship between the determination ranges and the hand area. Specifically, the portable device 1 may set two determination ranges, which are circular areas of different radii centered about the hand position. Then, the portable device 1 can distinguish between the shape in which the hand is closed, the shape in which the hand is beginning to open, and the shape in which the hand is open, as the shape of the hand.

By setting a plurality of determination ranges as described above, it is possible to specify the shape of the hand more specifically.

As described above, in the first embodiment, the portable device 1 determines the shape of the hand by using the determination range 22 based on the center-of-gravity position without specifying the hand area 21 in the captured image. Then, there is no need for the image recognition process for specifying the hand area 21, and it is possible to specify the shape of the hand with a simple method. In other words, it is possible to reduce the process load of the process for specifying the shape of the hand, and it is possible to increase the speed of the process.

[3. Specific Example of Process Performed by Portable Device 1]

Figure 11:
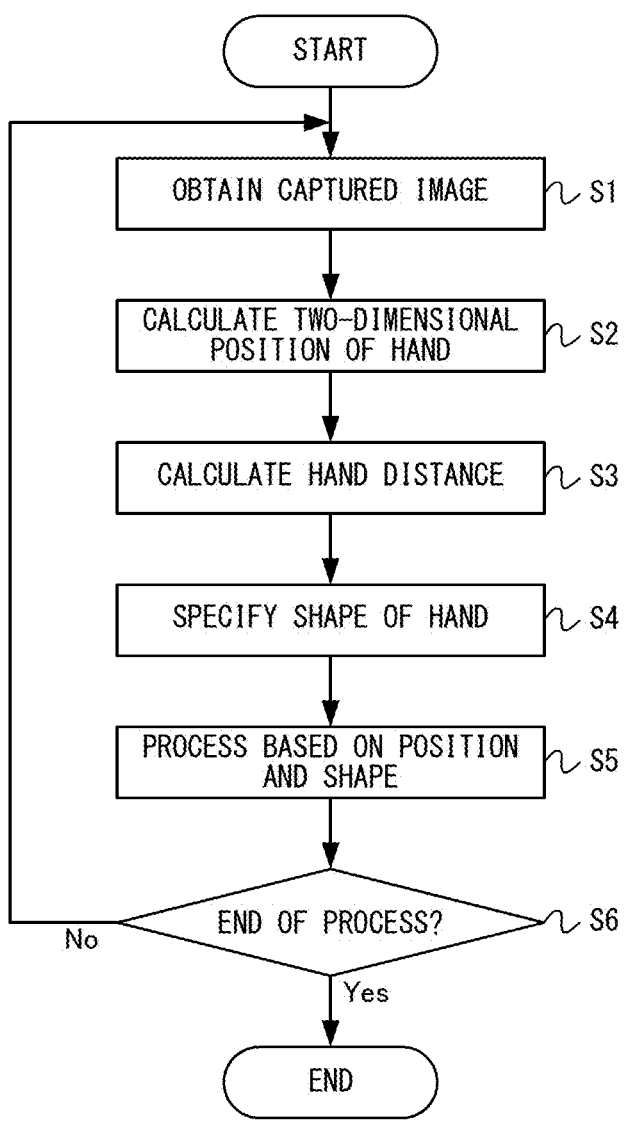
FIG. 11 is a flow chart showing an example of the flow of a process performed by a non-limiting example portable device.

Next, a specific example of the process performed by the portable device 1 will be described. FIG. 11 is a flow chart showing an example of the flow of the process performed by the portable device 1. A series of processes shown in FIG. 11 may be performed under any condition and with any timing. In the first embodiment, the series of processes are performed while running a predetermined application program (e.g., a game program) that accepts gesture inputs.

Note that in the present application, the process in each step in the flow chart shown in the figure is merely an example, and the order of steps may be switched around, or other processes may be performed in addition to (or instead of) these steps, as long as similar results are obtained. While the present embodiment is described herein assuming that the processes of the steps of the flow chart are performed by the CPU of the portable device 1, processes of some of the steps of the flow chart may be performed by a processor or a dedicated circuit other than the CPU. Some of the processes performed by the portable device 1 may be performed by another information processing device capable of communicating with the portable device 1 (e.g., a server capable of communicating with the portable device 1 via a network). That is, the processes shown in FIG. 11 (this also applies to the processes of FIG. 19, FIG. 27 and FIG. 33) may be performed through a cooperation of a plurality of information processing devices including the portable device 1.

The control section 14 performs the processes shown in FIG. 11 (this also applies to the processes of FIG. 19, FIG. 27 and FIG. 33) by using a memory. That is, the control section 14 stores information (data) obtained through the process steps in a memory, and the control section 14 reads out the information from the memory when such information is to be used in a subsequent process step.

First, in step S1, the control section 14 of the portable device 1 obtains, from the infrared camera 4, a captured image captured by the infrared camera 4. That is, as the infrared camera 4 captures an image at a predetermined time interval, the control section 14 obtains the captured image from the infrared camera 4 and stores data of the captured image in a memory.

In step S2, based on the captured image obtained in step S1, the control section 14 calculates the two-dimensional position of the hand (the position with respect to the direction perpendicular to the image-capturing direction of the infrared camera 4) included in the captured image. The two-dimensional position is calculated by the method described in "(Calculating position with respect to x-axis direction and y-axis direction)" above.

In step S3, based on the captured image obtained in step S1, the control section 14 calculates the distance of the hand included in the captured image (the position with respect to the image-capturing direction of the infrared camera 4). The distance is calculated by the method described in "(Calculating position with respect to the z-axis direction)" above.

In step S4, based on the captured image obtained in step S1, the control section 14 specifies the shape of the hand included in the captured image (whether the hand is in an open shape or in a closed shape). The shape of the hand is calculated by the method described in "(Calculating shape of hand)" above.

In step S5, the control section 14 performs a predetermined process based on the three-dimensional position and the shape of the hand calculated in the series of processes of steps S2 to S4. The predetermined process may be any information process in which the three-dimensional position and the shape of the hand are used as inputs. For example, the control section 14 performs a process of controlling an object in a virtual space (e.g., a player character, a cursor, etc., appearing in the game space) in accordance with the three-dimensional position and the shape of the hand. For example, the control section 14 may detect a gesture input based on the three-dimensional position and the shape of the hand, and perform a process in accordance with the detected gesture input. In the process of step S5, the control section 14 may display an image representing the results of the predetermined process on the display 2.

In step S6, the control section 14 determines whether or not to end the series of processes performed in accordance with the position and the shape of the hand. The specific method of the determination in step S6 may be any method. In the first embodiment, if a user gives a predetermined end instruction (e.g., an instruction to end an application), it is determined to end the series of processes. If the determination result of step S6 is affirmative, the control section 14 ends the process shown in FIG. 11. On the other hand, if the determination result of step S6 is negative, the control section 14 performs the process of step S1 again. Thereafter, the series of processes of steps S1 to S6 are performed repeatedly until it is determined in step S6 to end the process.

[4. Function/Effect of First Embodiment]

As described above, in the first embodiment, the portable device 1 obtains information regarding the brightness of each pixel based on the captured image (referred to also as the "camera image") (step S1), and calculates the position information of the captured image representing the deviation obtained with the brightness of each pixel being used as a weight (the information of the center-of-gravity position) (step S2). Then, the portable device 1 performs a predetermined information process based on the position information (step S5). Note that while the area (in the captured image) for which the position information is calculated is the entire area of the captured image in the embodiment described above, it may be any area to be set independently of the area of the image of the object (a hand). That is, "to calculate position information for a captured image" means to include both the embodiment in which the position information is calculated for the entire area of the captured image and the embodiment in which the position information is calculated for a partial area of the captured image. The predetermined information process may be any process, and is, for example, an information process performed in accordance with the position, the shape and/or the movement of the object (a hand).

As described above, the portable device 1 is capable of calculating the position of the object by a simple process. The portable device 1 is capable of calculating the position of the object by a simple method without specifying an area of the object by an image recognition process, etc., for example.

Note that the portable device 1 may calculate information representing the position of the object based on the position information or may calculate information representing the change in the position (speed) of the object to perform an information process based on the calculated information. Then, it is possible to perform an information process in which the position and/or the movement of the object is used as a user input.

The portable device 1 may calculate information representing the shape of the object included in the captured image based on the position information (step S4), and perform an information process based on the information (step S5). Note that the information process may be a process in which the shape of the object is used as an input, or a process in which the change in the shape (the movement) of the object is used as an input. As described above, it is possible to perform an information process in which the shape of the object and/or the change thereof is used as a user input.

Note that in the embodiment described above, the portable device 1 sets a determination range on a captured image based on the position (center-of-gravity position) on the captured image specified by position information, and calculates the shape of the object (whether the hand is in an open shape or in a closed shape) based on the relationship between the determination range and the area of the image of the object (step S4). Then, the portable device 1 can specify the shape of the object without specifying the area of the object in the captured image. The portable device 1 can specify the shape of the object by a simple process since it is not needed to specify the area of the object by an image recognition process, or the like.

Note that the portable device 1 calculates the brightness (the average brightness value) of the captured image (step S3), and performs an information process based on the position information and the brightness (step S5). Then, as the position information and the brightness are used as inputs, it is possible to allow for a wider variety of operations. Note that the area for which the brightness of the captured image is calculated may be the same as, or different from, the area for which the position information is calculated. The area for which the brightness of the captured image is calculated may be set independently of the area of the image of the object in the captured image.

The portable device 1 calculates information representing the position and/or the movement for the image-capturing direction (the z-axis direction) of the infrared camera 4 (step S3), and performs an information process in accordance with the information (step S5). Then, it is possible to calculate the position with respect to the image-capturing direction by a simple process.

Moreover, the portable device 1 may calculate information representing the two-dimensional position with respect to the direction (the x-axis direction and the y-axis direction) generally perpendicular to the image-capturing direction based on the position information (step S2) to perform the information process based on the information (step S5). Note that the information may be information representing the two-dimensional movement in addition to, or instead of, the two-dimensional position. Then, the portable device 1 can calculate the three-dimensional position of the object based on the captured image.

In the embodiment described above, the portable device 1 calculates, as the position information, the center-of-gravity position of the whole area or a predetermined partial area of the captured image, in which the brightness of each pixel is used as a weight. Then, the portable device 1 can easily calculate an index representing the deviation of brightness across the predetermined area where the brightness of each pixel is used as a weight. Note that in other embodiments, the portable device 1 may calculate, as the position information, any index representing the deviation of the area, which is not limited to the center-of-gravity position.

[5. Variation]

Figure 12:
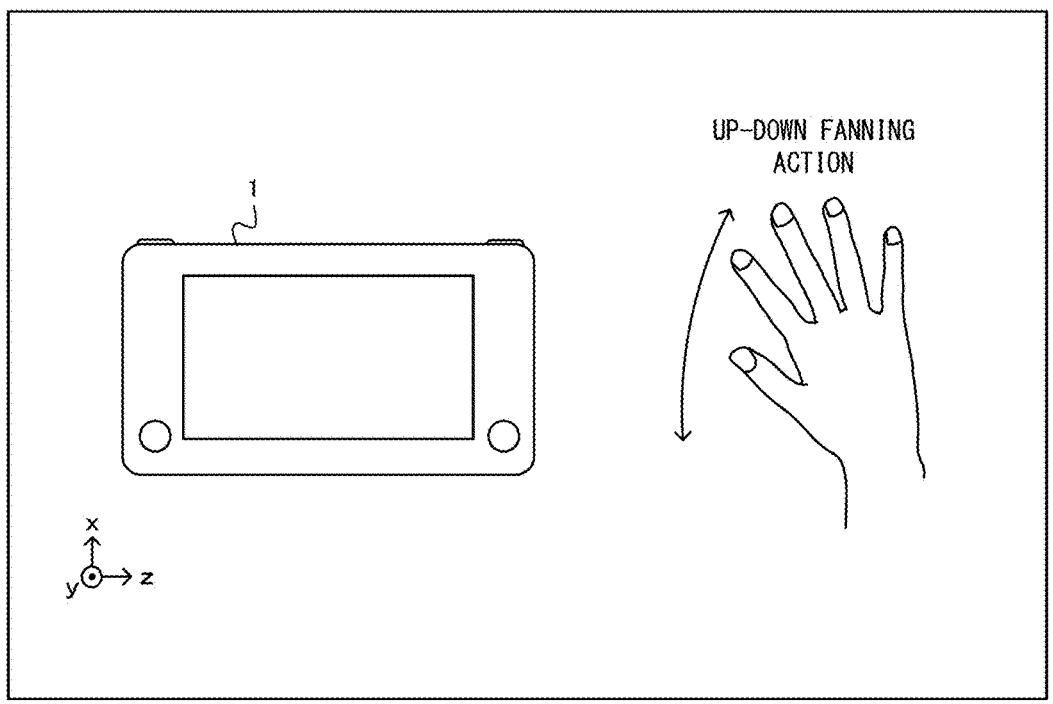
FIG. 12 shows an example of how a user performs a fanning action.
Figure 13:
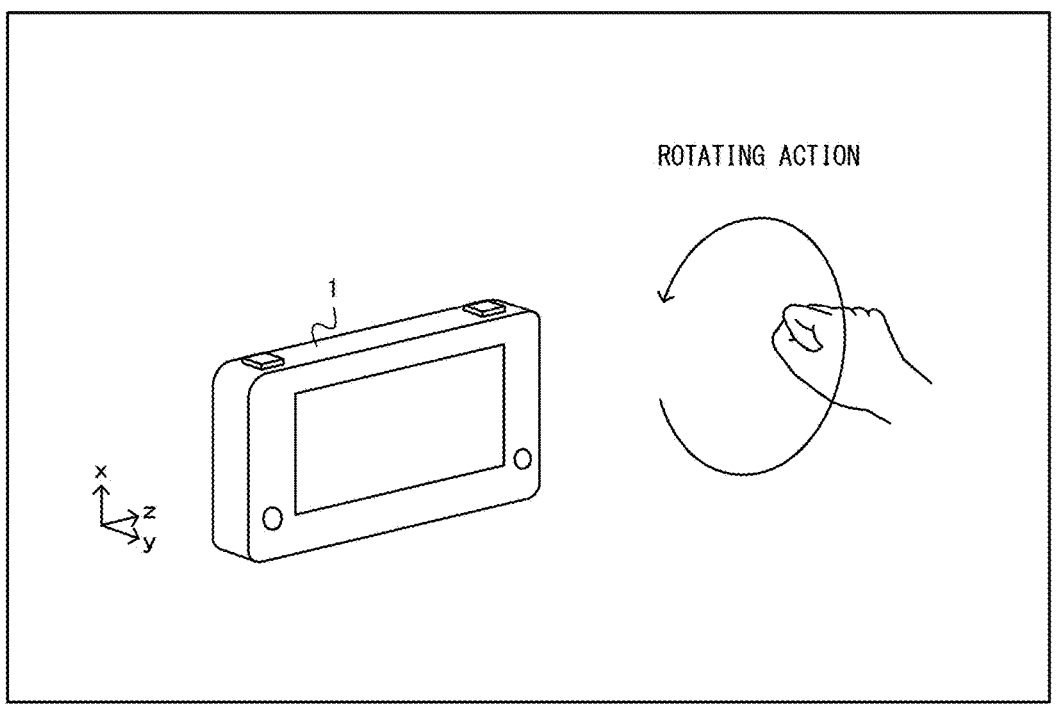
FIG. 13 shows an example of how a user performs a rotating action.
Figure 14:
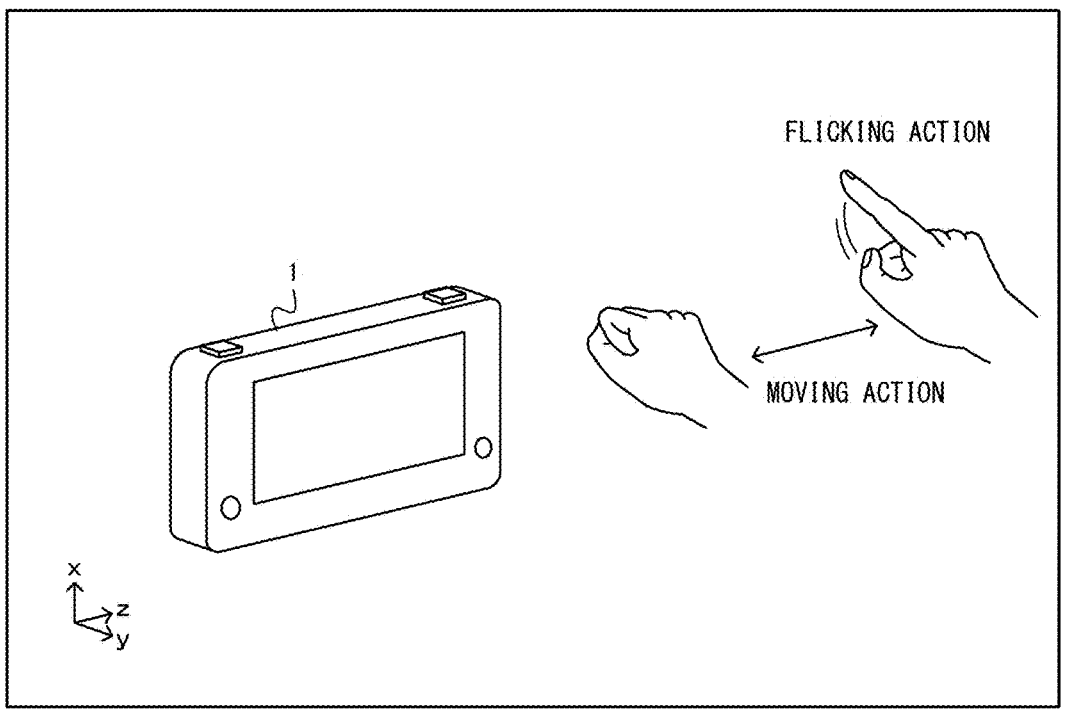
FIG. 14 shows an example of how a user performs a flicking action.

Variations (applications) using the information process of the first embodiment include the following examples, for example. FIG. 12 shows an example where a user performs a fanning action. FIG. 13 shows an example of how a user performs a rotating action. FIG. 14 shows an example of how a user performs a flicking action. The portable device 1 may detect these actions as gesture inputs by using the information process of the first embodiment, and perform processes in accordance with these actions.

Where a user performs an action of moving the hand up and down (fanning action), as shown in FIG. 12, the portable device 1 calculates the hand position (the position with respect to the x-axis direction) by using the method of the first embodiment. That is, the portable device 1 calculates the center-of-gravity position with respect to the direction corresponding to the x-axis direction on the captured image (e.g., the up-down direction in FIG. 6). Thus, in other embodiments, the portable device 1 may no need to calculate the three-dimensional position of the hand, and may calculate the position with respect to at least one direction. The portable device 1 may not need to calculate the shape of the hand.

The portable device 1 detects a fanning action based on the calculated hand position, and performs an information process in accordance with the fanning action. Specifically, the portable device 1 determines whether or not a fanning action has been performed in accordance with the change in the calculated hand position. That is, where the calculated hand position repeatedly moves in the up-down direction, it is determined that a fanning action has been performed. If it is determined that a fanning action has been performed, the portable device 1 performs a process of moving the object in the virtual space, for example. The portable device 1 may calculate the changing speed of the calculated position, and calculate the speed (rapidness) of the fanning action in accordance with the changing speed. Then, the portable device 1 may vary the content of the process in accordance with the speed of the fanning action. For example, the object moving speed may be controlled in accordance with the speed of the fanning action.

Where a user performs an action of rotating the hand (rotating action), as shown in FIG. 13, the portable device 1 calculates the two-dimensional position of the hand (the position with respect to the x-axis direction and the y-axis direction) by using the method of the first embodiment. The portable device 1 detects a rotating action based on the calculated two-dimensional position, and performs an information process in accordance with the rotating action. Specifically, the portable device 1 determines whether or not a rotating action has been performed based on the path along which the calculated two-dimensional position moves on a two-dimensional coordinate system. For example, it is determined that a rotating action has been performed when the path is ring-shaped. If it is determined that a rotating action has been performed, the portable device 1 performs a process of moving (e.g., rotating) an object in the virtual space. For example, the process may be a process of spinning a wheel of a monocycle that the player character rides, or a process of winding a reel in a fishing game. Note that the portable device 1 may calculate the rotation angle of the rotating action (e.g., the angle representing the direction toward the hand position with respect to the center position of the rotation), and perform a process in accordance with the rotation angle (e.g., a process of rotating the object in accordance with the rotation angle). The portable device 1 may calculate the rotation speed of the two-dimensional position, and calculate the speed of the rotating action in accordance with the rotation speed. Then, the portable device 1 may vary the content of the process in accordance with the speed of the rotating action. For example, the rotation speed of the object may be controlled in accordance with the speed of the rotating action.

Note that a fanning action with respect to the up-down direction (the x-axis direction) and a rotating action about an axis extending in the left-right direction (the z-axis direction) have been described above as examples. Now, according to the method for calculating the hand position in the first embodiment, since it is possible to calculate the three-dimensional position of the hand, it is possible to detect the fanning action and the rotating action with respect to other directions. Therefore, in other embodiments, the portable device 1 may detect a fanning action with respect to another direction, or a rotating action about an axis extending in another direction.

In other embodiments, the portable device 1 may detect both the fanning action and the rotating action. Specifically, the portable device 1 may specify the shape of the hand using the method of the first embodiment, and switch between actions to be detected in accordance with the shape of the hand. For example, when the shape of the hand is specified as being open (the open-palm shape), the portable device 1 may detect the presence/absence of a fanning action, and when the shape of the hand is specified as being closed (the closed-fist shape), the portable device 1 may detect the presence/absence of a rotating action.

Where a user performs the action of moving the hand in a predetermined direction (the z-axis direction in FIG. 14) and the action of flicking a finger (flicking action) as shown in FIG. 14, the portable device 1 determines the shape of the hand, while calculating the hand position (the position with respect to the z-axis direction) by using the method of the first embodiment. In the example shown in FIG. 14, the portable device 1 uses the determination range of the first embodiment to determine whether or not the hand is in a closed shape or in such a shape that the user has flicked a finger. When the shape of the hand changes from the closed shape to the flicking shape (the shape of the hand with one finger extended), the portable device 1 determines that a flicking action has been performed.

The portable device 1 may perform a process of moving an object in the virtual space in accordance with the hand position, while making the object perform a predetermined action in response to the flicking action. For example, the portable device 1 may move a cannon object in the virtual space in accordance with the hand position and fire a cannonball from the cannon in response to a flicking action.

Second Embodiment

Next, a second embodiment will be described. In the second embodiment, the portable device 1 calculates the three-dimensional position of the hand based on the captured image by using a method different from that of the first embodiment. The portable device 1 controls the movement of the cursor in the three-dimensional virtual space by using the calculated three-dimensional position. Note that the hardware configuration of the portable device 1 of the second embodiment will not be described in detail as it is the same as that of the first embodiment.

[1. Outline of Process Performed by Portable Device 1]

(Calculating Position and Shape of Hand)

Figure 15:
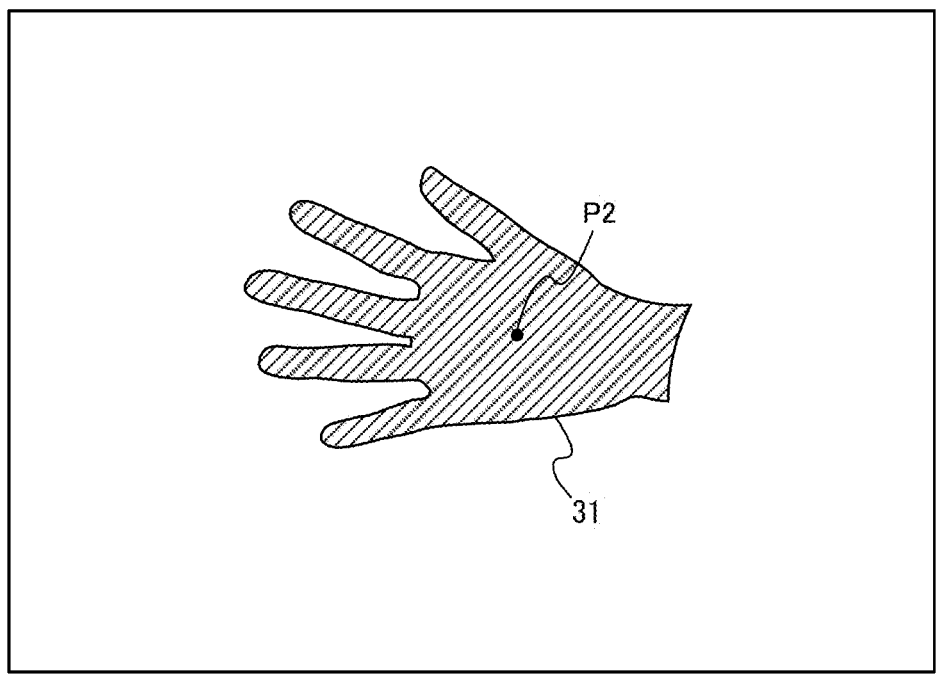
FIG. 15 shows an example of an area of a hand detected from a captured image.

In the second embodiment, the portable device 1 detects the area of the hand of the user included in a captured image. FIG. 15 shows an example of the area of the hand detected from a captured image. A hand area (the area of the image of the hand in the captured image) 31 is detected by a predetermined image recognition process performed on the captured image. The image recognition process may be a conventional process including, for example, a contour extraction process, a process of detecting the hand area by pattern matching, a process of removing noise areas (areas other than the hand), etc. Note that it is possible to specify the shape of the hand (e.g., whether the hand is in a closed shape or in an open shape) by an image recognition process of detecting the hand area 31 as will be described later. The area of a finger in the hand area 31 can be specified by detecting the hand area 31.

Upon detecting the hand area 31, the portable device 1 calculates the three-dimensional position of the hand based on the hand area 31. The specific method for calculating the three-dimensional position of the hand may be any method. In the second embodiment, the portable device 1 calculates the position with respect to the two-dimensional direction (the x-axis direction and the y-axis direction) perpendicular to the image-capturing direction of the infrared camera 4, based on the position of the hand area 31 on the captured image. The two-dimensional position of the hand (the position with respect to the x-axis direction and the y-axis direction) is calculated as the center position of the hand area 31 (the position P2 shown in FIG. 15). Note that in other embodiments, the portable device 1 may calculate, as the two-dimensional position of the hand, the center-of-gravity position obtained with the brightness value of each pixel in the hand area 31 being used as a weight. Note that the center-of-gravity position is a center-of-gravity position obtained by a calculation performed for the hand area 31, and is different from the center-of-gravity position of the first embodiment.

Based on the size of the hand area 31 on the captured image, the portable device 1 calculates the position (the distance from the infrared camera 4) with respect to the image-capturing direction of the infrared camera 4 (the z-axis direction). The method for calculating the hand distance (the position with respect to the z-axis direction) from the hand area 31 may be any method. For example, the portable device 1 may store, in advance, information representing the correlation between the size of the hand area 31 and the distance (which may be a table or may be a function), and calculate the distance based on the correlation.

Figure 16:
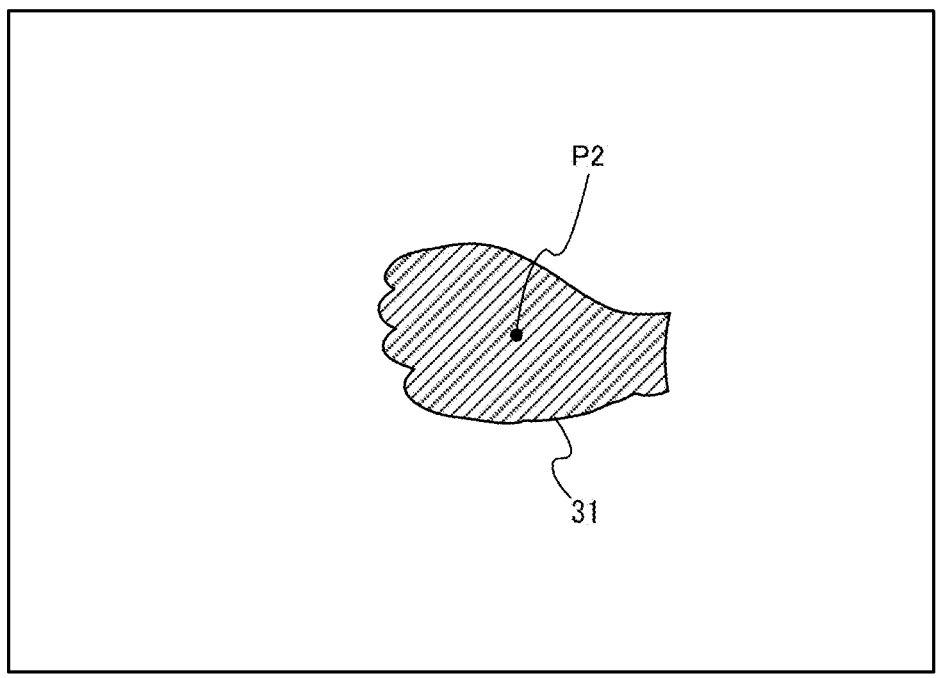
FIG. 16 shows an area of a hand extracted from a captured image where the hand is in a closed shape.

In the second embodiment, the portable device 1 specifies the shape of the hand based on the captured image. FIG. 15 shows the hand area extracted from the captured image where the hand is in an open shape. On the other hand, FIG. 16 shows the hand area extracted from the captured image where the hand is in a closed shape. In the second embodiment, the portable device 1 specifies the shape of the hand to be either an open-hand shape (the open-palm shape) or a closed-hand shape (the closed-fist shape).

The method for specifying the shape of the hand may be any method. For example, the shape of the hand can be specified by an image recognition process for detecting the hand area 31. In the second embodiment, the portable device 1 provides a reference image corresponding to the open-hand shape and a reference image corresponding to the closed-hand shape, and performs a pattern match using the two reference images in the image recognition process so at to determine the shape of the hand.

As described above, in the second embodiment, the portable device 1 calculates the three-dimensional position of the hand and the shape of the hand by detecting the area of the hand by an image recognition process. Note that also in the second embodiment, the portable device 1 may calculate the position and/or the shape of the hand by using the method of the first embodiment.

(Cursor Control Based on Position and Shape of Hand)

In the second embodiment, based on the three-dimensional position of the hand calculated as described above, the portable device 1 controls the cursor in the three-dimensional virtual space. Based on the shape of the hand specified as described above, the portable device 1 switches between the selected state and the unselected state of the cursor. Thus, in the second embodiment, the user can three-dimensionally move the cursor by three-dimensionally moving the hand, and can also perform a so-called "drag and drop" operation using the cursor.

Figure 17:
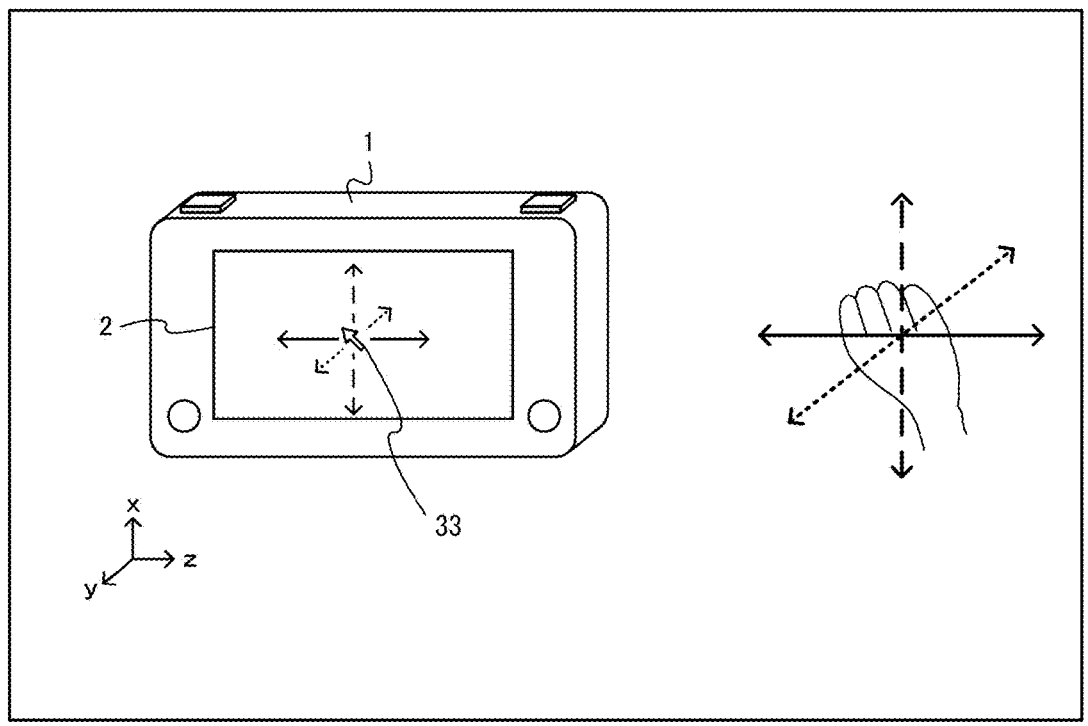
FIG. 17 shows an example of an operation performed in a second embodiment.

FIG. 17 shows an example of an operation performed in the second embodiment. As shown in FIG. 17, the user can move a cursor 33 in three-dimensional directions in the virtual space displayed on the display 2, by moving the hand, in three-dimensional directions, i.e., up and down (the x-axis direction), left and right (the z-axis direction), and forward and backward (the y-axis direction). That is, the portable device 1 can calculate the three-dimensional position of the cursor 33 in the virtual space based on the three-dimensional position of the hand calculated based on the captured image. The specific method for calculating the position of the cursor 33 may be any method. The portable device 1 may calculate the position of the cursor 33 so that the three-dimensional position of the cursor 33 in the virtual space corresponds to the three-dimensional position of the hand in the real space. For example, the portable device 1 may calculate the position of the cursor 33 so as to move the cursor 33 in a direction (in the virtual space) corresponding to the three-dimensional position of the hand with respect to the reference position in the real space.

Now, in the present embodiment, the movement of the cursor 33 is controlled so that the moving direction of the hand generally coincides with the moving direction of the cursor 33 on the display 2 (see the arrows in FIG. 17). That is, the portable device 1 calculates the three-dimensional position including (a) the first position with respect to the side surface direction (the z-axis direction), (b) the second position with respect to the direction (the y-axis direction) perpendicular to the side surface direction and perpendicular to the screen of the display 2, and (c) the third position with respect to the direction (the x-axis direction) perpendicular to the side surface direction and parallel to the screen. Then, the portable device 1 (*a*) performs a cursor movement process with respect to the direction in the virtual space corresponding to the left-right direction of the screen based on the first position, (b) performs a cursor movement process with respect to the direction in the virtual space corresponding to the depth direction of the screen based on the second position, and (c) performs a cursor movement process with respect to the direction in the virtual space corresponding to the up-down direction of the screen based on the third position. Then, the moving direction of the hand of the user in the real space generally coincides with the moving direction of the cursor 33 in the virtual space displayed on the display 2, thereby enabling an intuitive operation and improving the controllability of the cursor 33.

The portable device 1 switches between the selected state and the unselected state of the cursor 33 in accordance with the shape of the hand specified based on the captured image. As used herein, the selected state refers to a state where the cursor 33 can select an object in the virtual space, and the unselected state refers to a state where the cursor 33 cannot select an object. When the cursor 33 is selecting an object, the object is moved following the movement of the cursor 33. In the second embodiment, the cursor 33 is set to the selected state when the hand in the closed shape is detected, and the cursor 33 is set to the unselected state when the hand in the open shape is detected.

Figure 18:
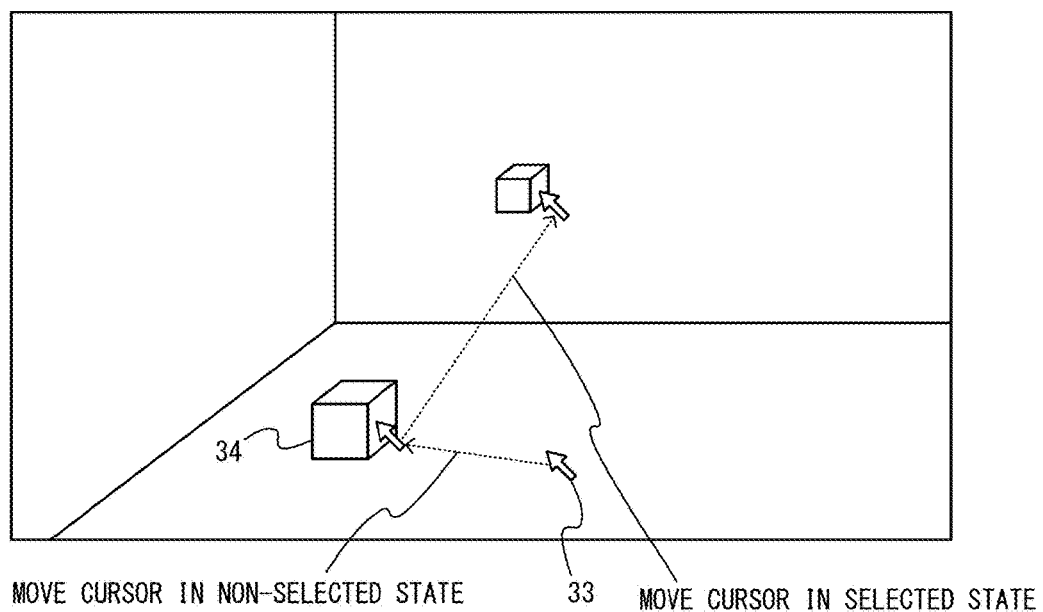
FIG. 18 shows an example where an object in a virtual space is moved by using a cursor.

FIG. 18 shows an example where an object in the virtual space is moved by using the cursor 33. FIG. 18 shows how after the cursor 33 is moved in the unselected state, the state switches to the selected state while the cursor 33 points at an object 34, and the cursor 33 in the selected state moves together with the object 34. In FIG. 18, the user first moves the hand in the open position. In response to this, the portable device 1 moves the cursor 33 in the unselected state. The user moves the hand in the open position until the cursor 33 is located so as to point at the object 34. When the cursor 33 is located so as to point at the object 34, the user closes the hand. In response to this, the portable device 1 switches the cursor 33 from the unselected state to the selected state. Then, the object 34 pointed at by the cursor 33 becomes selected. Then, the user moves the hand while keeping the hand in the closed position. In response to this, the portable device 1 moves the object 34 together with the cursor 33. Thus, the user can perform a drag operation on the object 34. Then, in response to the user changing the hand position from the closed position to the open position, the cursor 33 turns into the unselected state, thereby stopping the movement of the object 34. Thus, the user can perform a drop operation on the object 34.

As described above, according to the second embodiment, the user can perform a drag and drop operation in the virtual space by way of an action of three-dimensionally moving the hand and an action of switching the hand position between the closed position and the open position. As the user moves a hand in the space in the side surface direction of the portable device 1, the user can perform a cursor operation while the user can easily view the display since the hand is unlikely to get in the way of the user viewing the display.

Note that in other embodiments, the cursor may move only in two-dimensional directions. That is, the portable device 1 may calculate the hand position in predetermined two-dimensional directions, and calculate the two-dimensional position of the cursor in the virtual space based on the calculated two-dimensional position.

[2. Specific Example of Process Performed by Portable Device 1]

Figure 19:
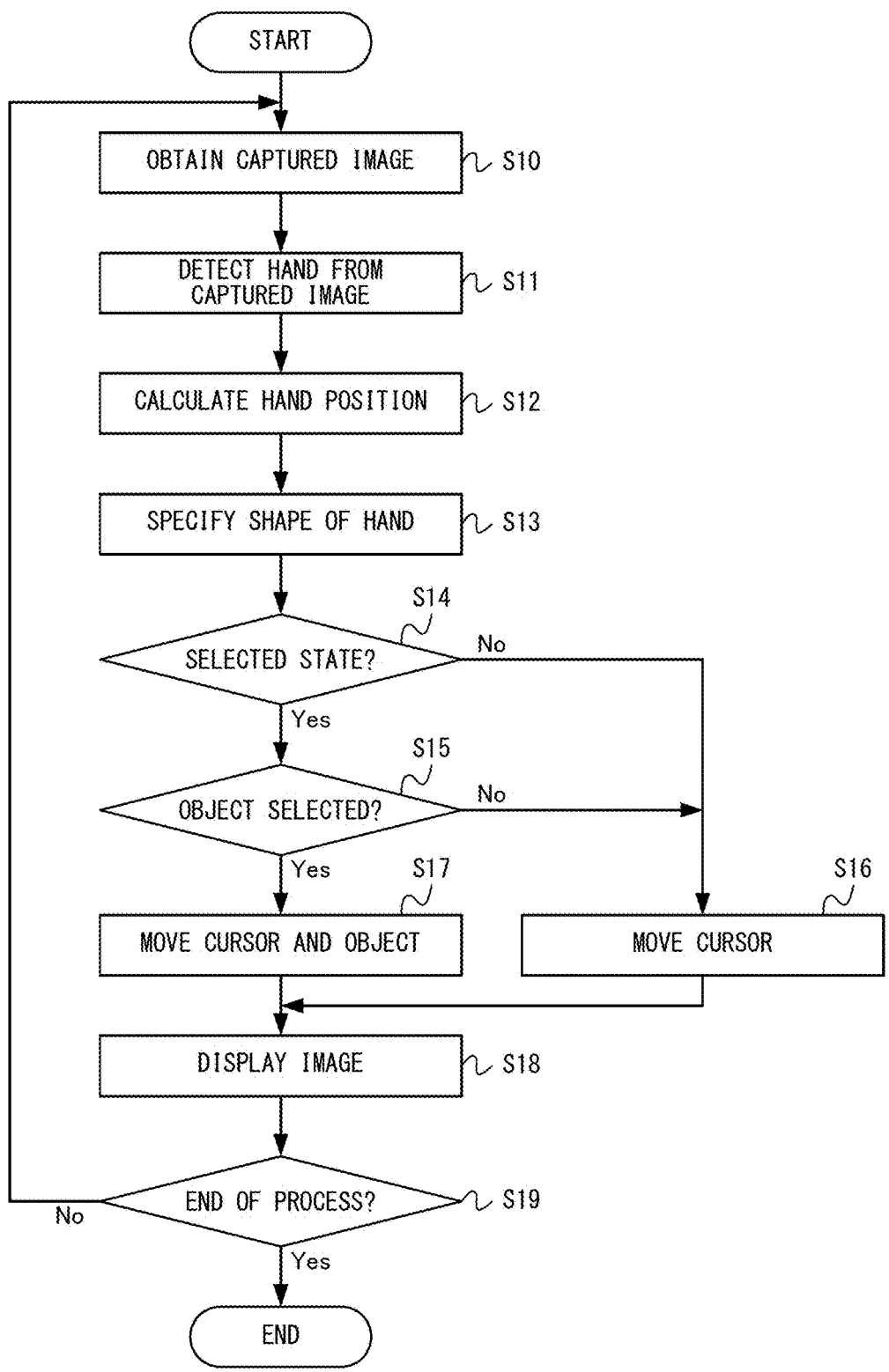
FIG. 19 is a flow chart showing an example of the flow of a process performed by a non-limiting example portable device of the second embodiment.

Next, a specific example of the process performed by the portable device 1 of the second embodiment will be described. FIG. 19 is a flow chart showing an example of the flow of the process performed by the portable device 1 of the second embodiment. A series of processes shown in FIG. 19 may be performed under any condition and with any timing. For example, the series of processes are performed while running a predetermined application program (e.g., a game program) that accepts gesture inputs.

In step S10, as with the process of step S1 of the first embodiment, the control section 14 obtains, from the infrared camera 4, the captured image captured by the infrared camera 4. Then, in step S11, the control section 14 detects the hand area in the captured image obtained in step S11. Moreover, in step S12, the control section 14 calculates the three-dimensional position of the hand based on the hand area detected in step S11. Then, in step S13, the control section 14 specifies the shape of the hand based on the captured image obtained in step S10. The series of processes of steps S11 to S13 are performed by the method described in "(Calculating position and shape of hand)" above.

In step S14, the control section 14 determines whether or not the cursor 33 is in the selected state. This determination is made based on whether or not the shape of the hand specified in step S13 is an open shape. If the determination result of step S14 is affirmative, the process of step S15 is performed. On the other hand, if the determination result of step S14 is negative, the process of step S16 to be described later is performed.

In step S15, the control section 14 determines whether or not an object is being selected by the cursor 33. This determination is made based on whether or not the cursor 33 is located so as to point at the object. If the determination result of step S15 is negative, the process of step S16 is performed. On the other hand, if the determination result of step S15 is affirmative, the process of step S17 to be described later is performed.

In step S16, the control section 14 controls the movement of the cursor 33 in the virtual space based on the three-dimensional position of the hand calculated in step S12. The control of the movement of the cursor 33 is performed by the method described in "(Cursor control based on position and shape of hand)" above. Following step S16, the process of step S18 to be described later is performed.

On the other hand, in step S17, the control section 14 controls the movement of the cursor 33 in the virtual space and the object being pointed at by the cursor 33, based on the three-dimensional position of the hand calculated in step S12. The method for controlling the movement of the cursor 33 and the object is the same as the movement control method of step S16 described above, except that the object is moved together with the cursor 33. Following step S17, the process of step S18 to be described later is performed.

In step S18, the control section 14 generates an image of the virtual space representing the results of the process of step S16 or S17, and displays the generated image on the display 2. Then, in step S19, the control section 14 determines whether or not to end the cursor movement control based on the position and the shape of the hand. The specific method of the determination in step S19 may be any method. In the second embodiment, if a user gives a predetermined end instruction (e.g., an instruction to end an application), it is determined to end the cursor movement control process. If the determination result of step S19 is affirmative, the control section 14 ends the process shown in FIG. 19. On the other hand, if the determination result of step S19 is negative, the control section 14 performs the process of step S10 again. Thereafter, the series of processes of steps S10 to S19 are performed repeatedly until it is determined in step S19 to end the process.

[3. Function/Effect of Second Embodiment]

As described above, in the second embodiment, the portable device 1 includes the infrared camera 4 for capturing an image (of the space) in the side surface direction of the housing, and calculates the three-dimensional position of an object (a hand of a user) included in the captured image based on the captured image captured by the infrared camera 4 (step S12). Then, the portable device 1 performs an information process in accordance with the three-dimensional position (step S16, S17). As described above, the portable device 1 performs an information process in which a user's action of moving a hand, etc., is used as an input. Since the user can perform input operations by moving a hand, etc., it is possible to make a variety of inputs. Since the infrared camera 4 captures an image of the space in the side surface direction of the portable device 1, and the user only needs to move a hand, etc., in the space in the side surface direction of the portable device 1, the user can hold the portable device 1 in one hand and perform an input operation using the other hand (see FIG. 5). Therefore, the user can easily perform input operations.

Note that also in the first embodiment, as in the second embodiment, the three-dimensional position of an object is calculated, and an information process in accordance with the calculated three-dimensional position is performed. Therefore, also in the second embodiment, as in the first embodiment, such effects as those described above can be realized.

In the second embodiment (this also applies to the first embodiment), the portable device 1 specifies the shape of the object (a hand) based on the captured image (step S13), and performs an information process in accordance with the three-dimensional position and the shape of the object (step S14). As described above, the user can perform input operations based on the shape of the hand, thereby allowing for a wider variety of inputs.

In the second embodiment (this also applies to the first embodiment), the portable device 1 specifies the position (the position of the cursor) in the three-dimensional virtual space based on the three-dimensional position. Then, the user can specify a three-dimensional position in the virtual space through an operation of three-dimensionally moving the hand. Moreover, for the specified position, the portable device 1 performs different information processes depending on the shape of the object (a hand) (e.g., performs processes while switching between the selected state and the unselected state of the cursor (step S14, S16, S17)). As described above, the user can specify a position in the virtual space by moving the hand, and specify the content of the information process based on the shape of the hand, thereby providing a position-specifying operation with a good controllability for the user.

Note that in the second embodiment, the portable device 1 specifies an image area of an object (a hand) included in the captured image (step S11), and specifies the shape of the object based on the image area (step S13). Then, the portable device 1 calculates the position of the object based on the specified image area of the object (step S12). Then, the portable device 1 can calculate the position and the shape of the object by specifying the area of the object.

Note that the portable device 1 may calculate the two-dimensional position of the object on the captured image, and calculate the three-dimensional position based on the two-dimensional position (e.g., calculate the three-dimensional position including the two-dimensional position), as in the first embodiment. The portable device 1 may specify the shape of the object based on the calculated two-dimensional position (e.g., specify the shape by using a determination range which is set based on the two-dimensional position). Then, the portable device 1 can specify the position and the shape of the object by a simple process.

In the second embodiment (this also applies to the first embodiment), the portable device 1 includes the display 2 provided on the front surface of the housing, and performs a information process of displaying an image in accordance with the three-dimensional position on the display 2 (step S18). Then, the results of the process performed by user's hand-moving actions are displayed on the display. Now, since the user moves a hand in the space in the side surface direction of the portable device 1, the hand is unlikely to get in the way of the image displayed on the display, thus improving the viewability of the image.

[4. Variation]

(Variation in which Direction of Hand is Calculated)

Where the hand area in the captured image is detected as in the second embodiment, the portable device 1 may calculate the direction of the hand. Now, the direction of the hand with respect to the rotation about an axis extending in the image-capturing direction (the z-axis direction) can be calculated based on the direction of the hand area in the captured image. The direction of the hand with respect to the rotation about an axis extending in the direction perpendicular to the image-capturing direction (the x-axis direction or the y-axis direction, etc.) can be calculated based on the brightness value of the hand area in the captured image. An example will now be described, as a variation of the second embodiment, in which the direction of the hand is calculated with respect to the rotation about an axis extending in the direction perpendicular to the image-capturing direction.

Figure 20:
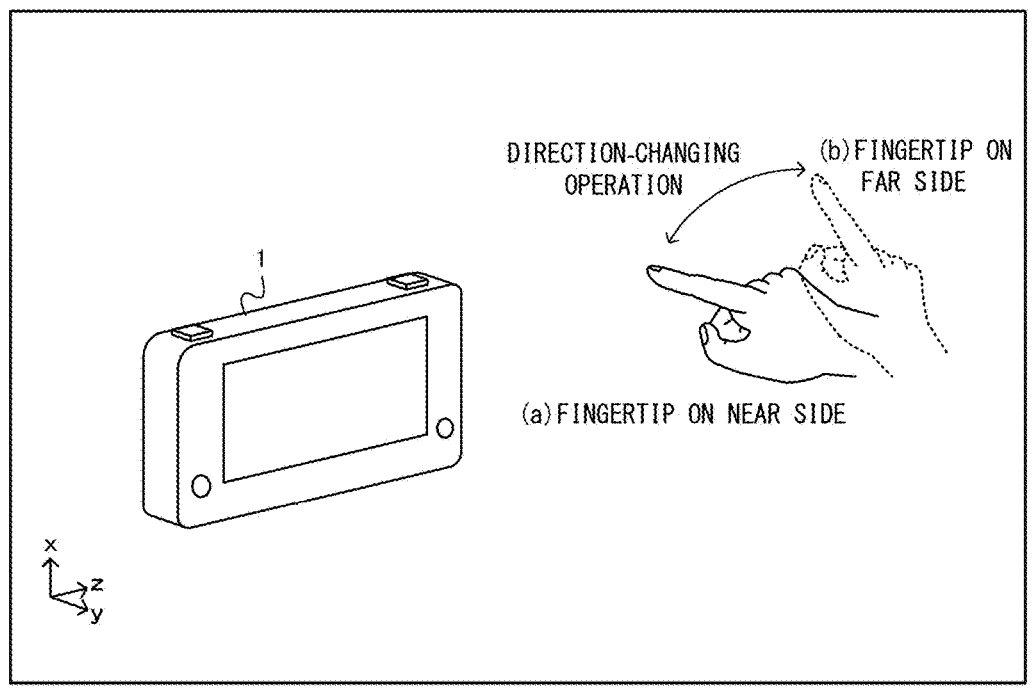
FIG. 20 shows an example of how a user performs a direction changing operation according to a variation of the second embodiment.

FIG. 20 shows an example of how a user performs a direction changing operation according to a variation of the second embodiment. As shown in FIG. 20, according to the present variation, the user performs an operation (direction changing operation) of changing the direction of the hand in the rotational direction about an axis extending in the up-down direction (the x-axis direction), with the index finger extended. The portable device 1 calculates the direction of the hand based on the captured image, and performs an information process in accordance with the direction of the hand.

Figure 21:
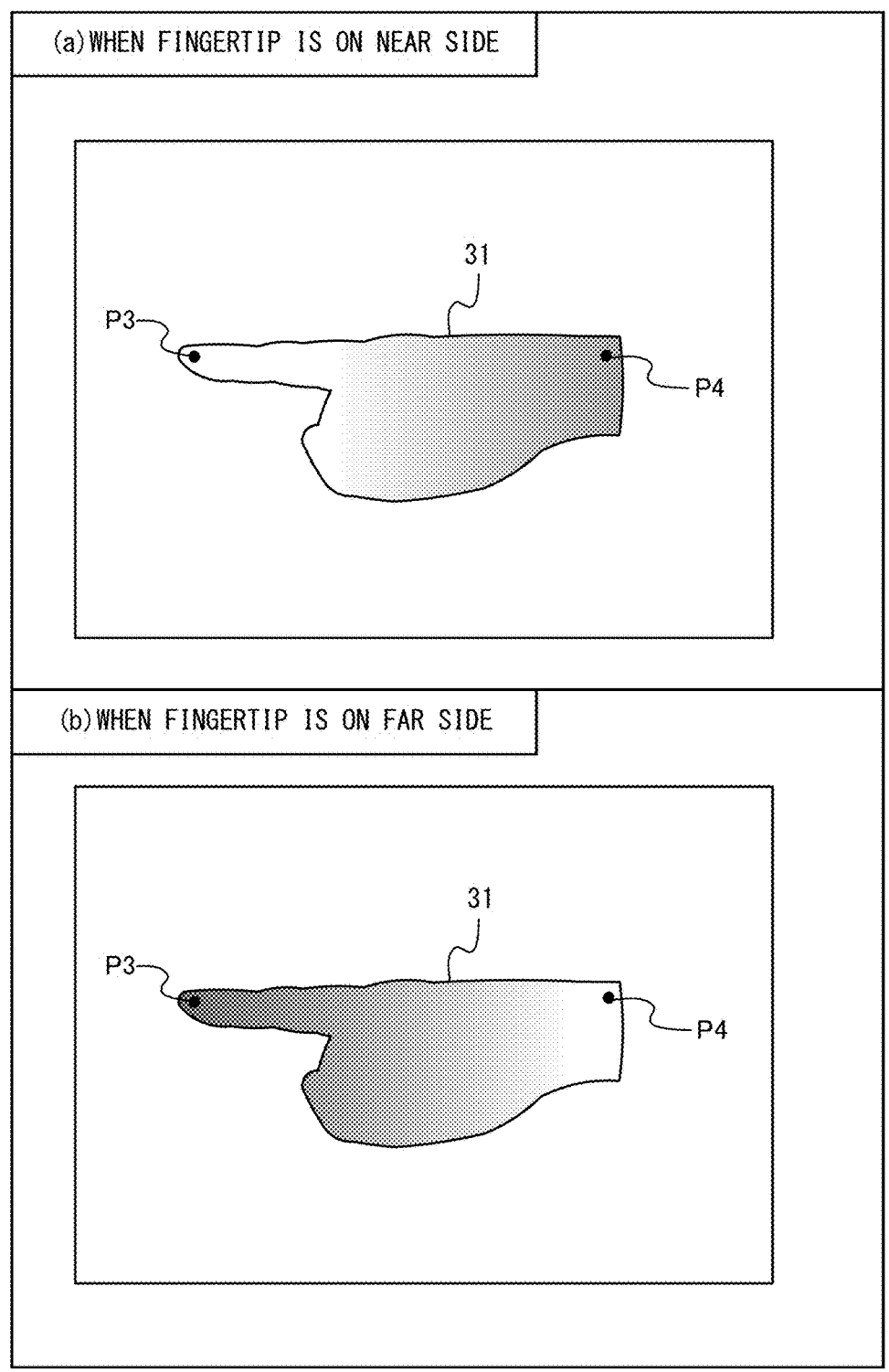
FIG. 21 shows an example of an area of a hand detected from a captured image for two cases where the hand is oriented differently.

FIG. 21 shows an example of an area of a hand detected from a captured image for two cases where the hand is oriented differently. In FIG. 21, the brightness value for the hand area 31 detected from the captured image is represented by degrees of shading.

As described above, the brightness value of the object captured by the infrared camera 4 is higher at positions closer to the infrared camera 4. Therefore, if the index finger as seen from the user is oriented leftward with respect to the front surface direction (the negative y-axis direction), as shown in the state (a) of FIG. 20, i.e., if the fingertip of the hand is on the near side with respect to the wrist as seen from the infrared camera 4, the hand area 31 in the captured image has a brightness value distribution as shown in (a) of FIG. 21. That is, the brightness value is higher in the left-side area (fingertip) of the hand area 31 than in the right-side area (wrist). On the other hand, if the index finger as seen from the user is oriented rightward with respect to the front surface direction, as shown in the state (b) of FIG. 20, i.e., if the fingertip of the hand is on the far side with respect to the wrist as seen from the infrared camera 4, the hand area 31 in the captured image has a brightness value distribution as shown in (b) of FIG. 21. That is, the brightness value is lower in the left-side area (fingertip) of the hand area 31 than in the right-side area (wrist). Although not shown in the figure, if the index finger is oriented in the front surface direction, i.e., the fingertip and the wrist are at substantially the same distance as seen from the infrared camera 4, the brightness value in the left-side area (fingertip) of the hand area 31 is substantially the same as the brightness value in the right-side area (wrist).

As described above, the direction of the hand with respect to the rotation about the x axis can be calculated based on the difference in the brightness value between the left-side area and the right-side area of the captured image. According to the present variation, the portable device 1 specifies the left-side area position and the right-side area position from within the hand area 31 detected from the captured image, and compares the brightness value between the two positions specified. Note that the two positions to be specified may be any positions that are selected from the hand area 31. For example, the portable device 1 may specify a position at a predetermined distance from the left end of the hand area, and a position at a predetermined distance from the right end of the hand area.

Based on the brightness value of the left-side area and the brightness value of the right-side area, the portable device 1 calculates the direction of the hand with respect to the rotation about an axis extending in the up-down direction (the x-axis direction). That is, where the brightness value of the left-side area and the brightness value of the right-side area are generally the same (where the difference is less than a predetermined value), the portable device 1 determines that the hand is oriented in the front surface direction as seen from the user. If the brightness value of the left-side area is higher than the brightness value of the right-side area by a predetermined value or more, the portable device 1 determines that the hand is oriented leftward with respect to the front surface direction (as seen from the user). If the brightness value of the left-side area is lower than the brightness value of the right-side area by a predetermined value or more, the portable device 1 determines that the hand is oriented rightward with respect to the front surface direction (as seen from the user). Thus, according to the present variation, the portable device 1 can determine whether or not the hand is oriented in the front surface direction, leftward with respect to the front surface direction, or rightward with respect to the front surface direction. In other embodiments, the portable device 1 may calculate the angle representing the direction of the hand.

Note that while a case where the direction of the hand with respect to the rotation about an axis extending in the up-down direction (the x-axis direction) is calculated has been described above, it is also possible to calculate the direction of the hand with respect to the rotation about an axis extending in the front-rear direction (the y-axis direction) by a method similar to that described above. That is, the portable device 1 may calculate the direction of the hand with respect to the rotation about an axis extending in the front-rear direction based on the brightness value of the upper area of the hand area 31 and the brightness value of the lower area thereof.

The portable device 1 performs an information process in accordance with the direction of the hand calculated as described above. The information process may be of any content. For example, the portable device 1 performs an information process for controlling the orientation (attitude) of the object in the virtual space in accordance with the direction of the hand. The portable device 1 may calculate the hand position in addition to the direction of the hand. Then, the portable device 1 may control the orientation (attitude) of the object in the virtual space in accordance with the direction of the hand, and control the position of the object in accordance with the hand position.

Third Embodiment

Next, a third embodiment will be described. Where operations are performed by the user by moving a hand, etc., around the portable device 1, it may be difficult for the user to grasp the hand position for making an intended input, or the positional relationship between the infrared camera 4 (the portable device 1) and the hand. In view of this, in the third embodiment, the portable device 1 displays a guide image for representing the hand position. Note that the hardware configuration of the portable device 1 of the third embodiment will not be described in detail as it is the same as that of the first embodiment.

[1. Outline of Process Performed by Portable Device 1]

Figure 22:
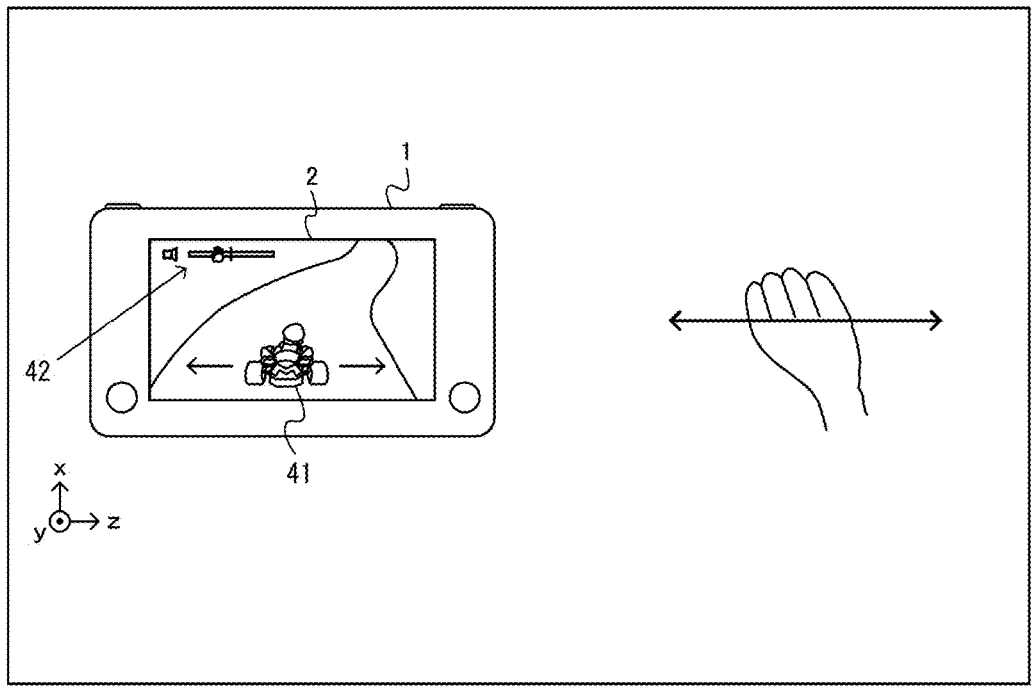
FIG. 22 shows an example of an operation performed in a third embodiment.

FIG. 22 shows an example of an operation performed in the third embodiment. As shown in FIG. 22, in the third embodiment, the user controls an object (player character) 41 in the virtual space by moving a hand in the image-capturing direction (the z-axis direction). That is, the portable device 1 calculates the hand position with respect to the image-capturing direction and controls the movement of the object 41.

Note that while FIG. 22 is directed to an example where a user controls a player character in a racing game, the information process to be performed with hand actions being used as inputs may be any information process. In the third embodiment, the portable device 1 controls the degree of turn (the left-right movement) of the object 41 in accordance with the hand position with respect to the image-capturing direction (distance) (see the arrows shown in FIG. 22). The portable device 1 may further control the speed of the object, and the like, through hand actions (e.g., the hand position with respect to the y-axis direction, and the shape of the hand).

As shown in FIG. 22, a guide image 42 is displayed, in addition to an image representing the results of a process based on a user's operation (an image of the game space), on the display 2. The details of the guide image 42 will be described later.

(Outline of Process Based on Hand Position)

Figure 23:
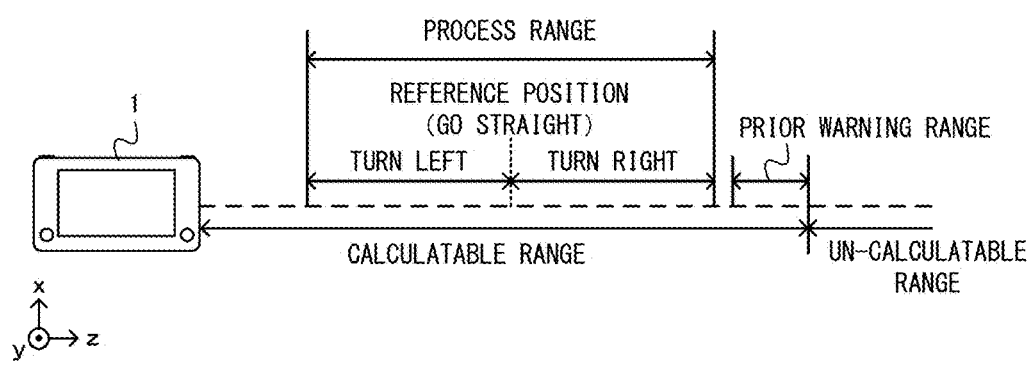
FIG. 23 shows an example of the relationship between the hand position and the information process.

FIG. 23 shows an example of the relationship between the hand position and the information process. Since the portable device 1 calculates the hand position based on the captured image, it is not possible to detect the hand and it is not possible to calculate the hand position if the hand is too far away from the infrared camera 4 (e.g., if the distance to the infrared camera 4 is more than 40 cm). Herein, the range in which the hand position can be calculated is referred to as the "calculatable range", and the range in which the hand position cannot be calculated is referred to as the "un-calculatable range". As shown in FIG. 23, in the third embodiment, the calculatable range is a range within a predetermined distance from the infrared camera 4, and the un-calculatable range is a range further away from the infrared camera 4 than the predetermined distance.

In the third embodiment, the portable device 1 uses a predetermined range within the calculatable range, as the process range. The process range is a range in which the content of the process changes in accordance with the calculated hand position. That is, the portable device 1 changes the content of the process (herein, the degree of turn of the object) in accordance with the change in the hand position within the process range. Specifically, in the third embodiment, the portable device 1 makes the object 41 move straight when the calculated hand position is at a predetermined reference position within the process range, and controls the degree of turn of the object 41 in accordance with the difference between the calculated hand position and the reference position. As shown in FIG. 23, the object 41 is controlled to turn left when the calculated hand position is on the left side (closer to the infrared camera 4) of the reference position as seen from the user, and the object 41 is controlled to turn right when the calculated hand position is on the right side (away from the infrared camera 4) of the reference position as seen from the user. Note that the reference position is at the center of the process range in the third embodiment, but the reference position may be any position within the process range.

When the calculated hand position is outside the process range, the portable device 1 sets the degree of turn of the object 41 to a degree of turn that would be used when the hand position is at one of the boundaries of the process range that is closer to the calculated hand position. That is, when the hand position moves from within the process range to the outside of the process range, the degree of turn of the object 41 does not increase.

Note that as shown in FIG. 23, a prior warning range is set within the calculatable range in the third embodiment. The prior warning range is set for the purpose of giving the user a prior warning before the hand enters the un-calculatable range. The prior warning range is set as a range that is away from a predetermined position within the calculatable range (e.g., the reference position described above) by a predetermined distance toward the un-calculatable range. Note that it can also be said that the prior warning range is a range further away from the position of the infrared camera 4 than a predetermined distance. While the prior warning range does not overlap the process range in FIG. 23, it may overlap the process range in other embodiments.

In other embodiments, the portable device 1 may not only calculate the hand position with respect to the image-capturing direction (distance) but also calculate the hand position with respect to another direction.

(Specific Example of Guide Image)

Figure 24:
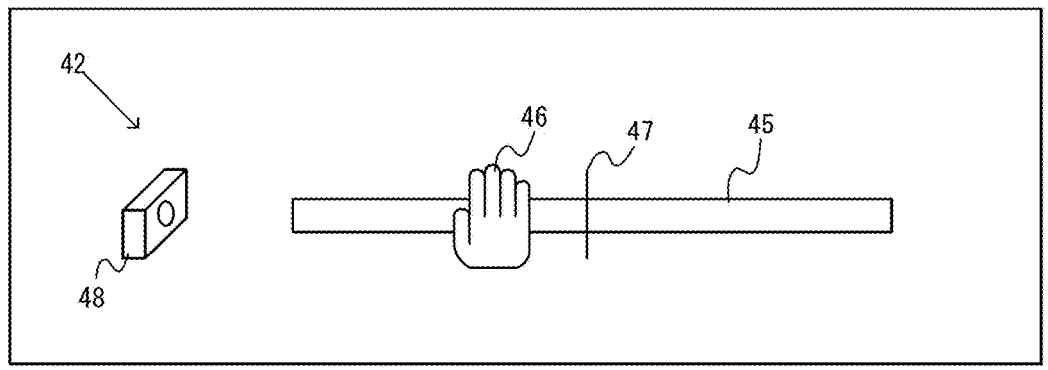
FIG. 24 shows an example of a guide image.

FIG. 24 shows an example of a guide image. As shown in FIG. 24, the guide image 42 includes a range image 45 and an indicator image 46. The range image 45 represents the area of the process range in the real space. The shape of the range image 45 may be any shape. In the third embodiment, the range image has a bar shape extending in the horizontal direction so as to represent the process range for the position in the image-capturing direction (the left-right direction as seen from the user).

The indicator image 46 is an image representing the hand position. The indicator image 46 moves, in accordance with the calculated hand position, within a range that is represented by the range image 45. Note that in the third embodiment, the output (the degree of turn of the object 41) of the portable device 1 changes in accordance with the calculated hand position, as described above. Therefore, it can be said that the position of the indicator image 46 changes in accordance with the output.

Now, with a control method in which the hand is moved around the portable device 1, as in the third embodiment, the hand can advantageously be moved freely, but it may be difficult for the user to grasp the reference position. In contrast, in the third embodiment, it is easier for the user to grasp the hand position because of the guide image 42. That is, the user can grasp the relationship between the hand position and the output by seeing the guide image 42, making it easier for the user to perform operations.

Note that in the third embodiment, the indicator image 46 is an image representing the hand (of the user), which is assumed to be an object used for performing operations. Thus, the user can easily know that the indicator image 46 is representing an object used for performing operations. The user can also easily know the method of operation (i.e., performing operations by using a hand).

Note that in other embodiments, the portable device 1 may change the display mode of the indicator image 46 in accordance with the specified shape of the hand. For example, the portable device 1 may display an indicator image that represents the specified shape of the hand. Specifically, where the portable device 1 determines that whether the hand is in a closed shape or in an open shape, the portable device 1 may display an indicator image representing the closed-fist shape when the closed-hand shape is specified and display an indicator image representing the open-palm shape when the open-hand shape is specified.

As shown in FIG. 24, the guide image 42 includes a process reference image 47. The process reference image 47 represents the position at which the indicator image 46 is placed when the hand is located at the reference position. That is, when the calculated hand position is the reference position, the indicator image 46 is placed at the position represented by the process reference image 47. Therefore, the user can make the object 41 move straight by placing the hand so that the indicator image 46 is located at the process reference image 47. Note that when the reference position is changed (e.g., the reference position may be changed in response to a user's settings-changing operation), the position of the process reference image 47 is also changed.

As described above, the portable device 1 controls the output so as to give an output in accordance with the relationship between the calculated hand position and the predetermined reference position, and displays the guide image including the process reference image on the display 2. Then, the user can adjust the hand so that the hand is placed at the reference position by seeing the guide image, thereby making it even easier for the user to perform operations.

As shown in FIG. 24, the guide image 42 includes a camera reference image 48. The camera reference image 48 is displayed so as to represent the positional relationship between the area of the process range represented by the range image 45 and the infrared camera 4 (the portable device 1). That is, the camera reference image 48 is placed at such a position that the positional relationship between the range image 45 and the camera reference image 48 corresponds to the positional relationship between the area of the process range and the infrared camera 4 (the portable device 1). Note that it can also be said that the camera reference image 48 is displayed so as to represent the positional relationship between the hand of the user and the infrared camera 4 (the portable device 1). That is, it can be said that the camera reference image 48 is placed at such a position that the positional relationship between the indicator image 46 and the camera reference image 48 corresponds to the positional relationship between the hand of the user and the infrared camera 4 (the portable device 1).

In the third embodiment, since the infrared camera 4 is present on the left side (the negative z-axis direction) of the process range, the camera reference image 48 is displayed on the left side of the range image 45 as shown in FIG. 24. With the camera reference image 48, the user can easily know about where the hand should be placed with respect to the infrared camera 4 (the portable device 1).

Note that while the guide image 42 is displayed at an upper left position on the screen of the display 2 in FIG. 22, the position at which the guide image 42 is displayed may be any position. For example, the guide image 42 may be displayed in an area on the side where the infrared camera 4 is provided (in other words, on the side of the image-capturing direction of the infrared camera 4). That is, in the present embodiment, the guide image 42 may be displayed in an area on the right side of the center of the screen. Then, the user can easily view the guide image 42 while moving the hand, and it is easier for the user to check the relationship between the display of the guide image 42 (the position of the indicator image 46 with respect to the range image 45) and the hand.

Figure 25:
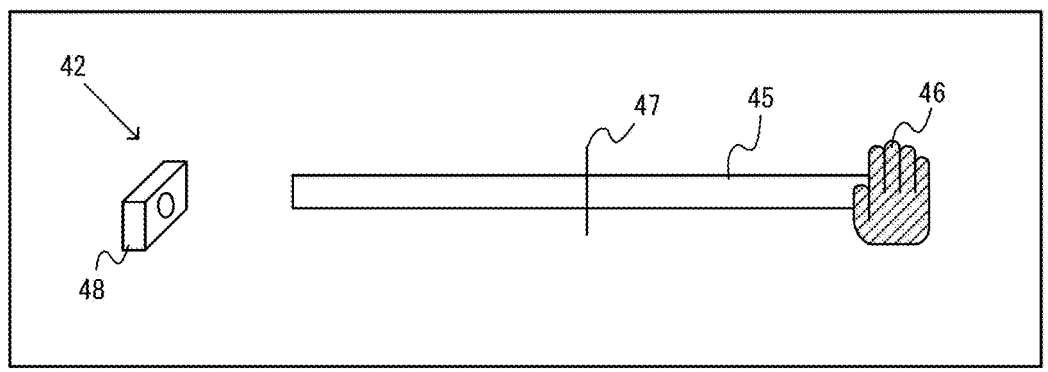
FIG. 25 shows an example of a guide image to be displayed when the hand position is in the prior warning range.

FIG. 25 shows an example of a guide image to be displayed when the hand position is in the prior warning range. In the third embodiment, when the hand position is in the prior warning range, the portable device 1 changes the display mode of the indicator image 46 (as compared with a case where the hand position is not in the prior warning range but is in the calculatable range). While the color of the indicator image 46 is changed in FIG. 25, the size and/or the shape of the indicator image 46 may be changed in other embodiments.

Thus, as the position of the hand of the user moves from the process range and comes close to the un-calculatable range, the hand position is included in the prior warning range, thereby changing the display mode of the indicator image 46. Therefore, as described above, when the user attempts to move the hand position into the un-calculatable range, the portable device 1 can notify the user in advance of the hand position entering the un-calculatable range, by changing the indicator image 46. Then, it is possible to reduce the possibility of the user moving the hand position into the un-calculatable range, thus improving the controllability for operations using a hand.

Note that in the third embodiment, since the prior warning range is set on the right side of the process range, when the hand position is in the prior warning range, it means that the hand position has moved past the right end of the process range. Therefore, in the third embodiment, when the hand position is in the prior warning range, the indicator image 46 is displayed at the right end of the range image 45. Thus, when the hand position is in the prior warning range, the indicator image 46 is displayed at the end portion of the range image 45 on the side of the prior warning range with respect to the process range. Thus, it is possible to notify the user, in an easy-to-understand manner, of which side the hand position is off the process range.

Note that in other embodiments, the prior warning range may be set on both sides of the process range. For example, where the hand position is regarded un-calculatable when it is too close to the infrared camera 4, the prior warning range may also be set on one side of the process range that is closer to the infrared camera 4.

Figure 26:
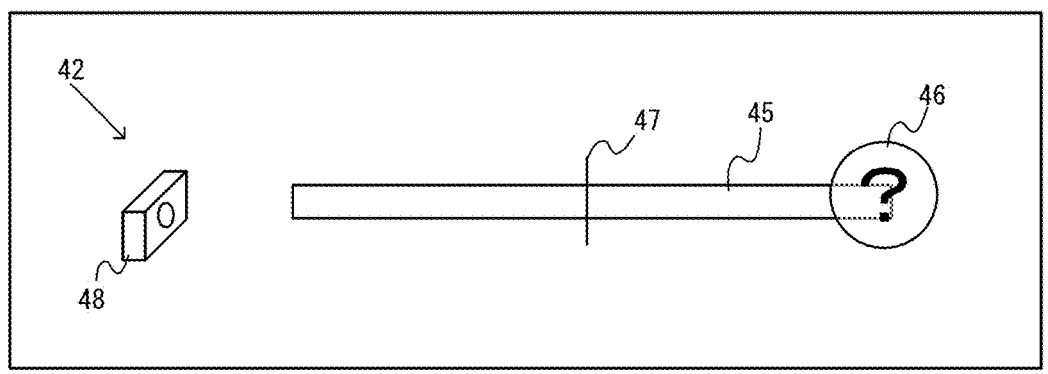
FIG. 26 shows an example of a guide image to be displayed when the hand position is un-calculatable.

FIG. 26 shows an example of a guide image to be displayed when the hand position is un-calculatable. In the third embodiment, when the hand position is in the un-calculatable range (when the hand position is un-calculatable), the portable device 1 changes the display mode of the indicator image 46, as compared with that when the hand position is calculated. Specifically, as shown in FIG. 26, when the hand position is in the un-calculatable range, the portable device 1 changes the indicator image 46 into a shape that indicates that the hand cannot be detected (a question-mark shape in FIG. 26). Thus, it is possible to notify the user, in an easy-to-understand manner, of the hand position being in such a state that the hand position cannot be detected (calculated). Note that while the shape of the indicator image 46 is changed in FIG. 26, the size and/or the color of the indicator image 46 may be changed in other embodiments. The display mode of the indicator image 46 when the hand position is in the un-calculatable range is different from the display mode when the hand position is in the prior warning range.

When the hand position is in the un-calculatable range, the indicator image 46 is displayed at the end portion of the range image 45 on the side of the un-calculatable range with respect to the process range. Therefore, in the third embodiment, the indicator image 46 is placed at the end portion of the range image 45 in such a case, as in the prior warning range. Note however that in other embodiments, when the hand position is in the un-calculatable range, the indicator image 46 may be placed at a different position (e.g., the position indicated by the process reference image 47).

Note that in the present embodiment, the portable device 1 changes the display mode of the indicator image 46 when the hand position is in the prior warning range or the un-calculatable range. Now, in other embodiments, the portable device 1 in such a case may change the display mode of a part or whole of the guide image 42, as opposed to only changing the display mode of the indicator image 46. For example, the portable device 1 in such a case may change the display mode of the range image 45 and/or the process reference image 47.

(Timing for Displaying Guide Image)

In the present embodiment, the portable device 1 displays the guide image 42, together with the game image, during the game process (see FIG. 22). Therefore, by seeing the guide image 42 while playing the game, the user can check the relationship between the hand position and the output, making it easier for the user to perform operations.

Note that in other embodiments, the timing for displaying the guide image 42 may be any timing. For example, the guide image 42 may be displayed before the game is played. That is, the portable device 1 displays the guide image 42 before the start of a game that is played in accordance with operations performed with a hand, and moves the indicator image in accordance with the movement of the hand, as in the embodiments described above. Then, in response to satisfaction of a predetermined starting condition (e.g., the user giving an instruction to start the game, or the passage of a predetermined amount of time since when the guide image 42 is displayed, etc.), the portable device 1 starts the game process that is played in accordance with operations performed with a hand. By displaying the guide image 42 before the start of the game, as described above, the user can grasp, to some degree, the feel of the game operation using a hand before the start of the game, making it easier for the user to perform game operations. Note that where the guide image 42 is displayed before the game is played, the guide image 42 does not need to be displayed during the game, or the guide image 42 may be displayed during a part or whole of the game.

[2. Specific Example of Process Performed by Portable Device 1]

Figure 27:
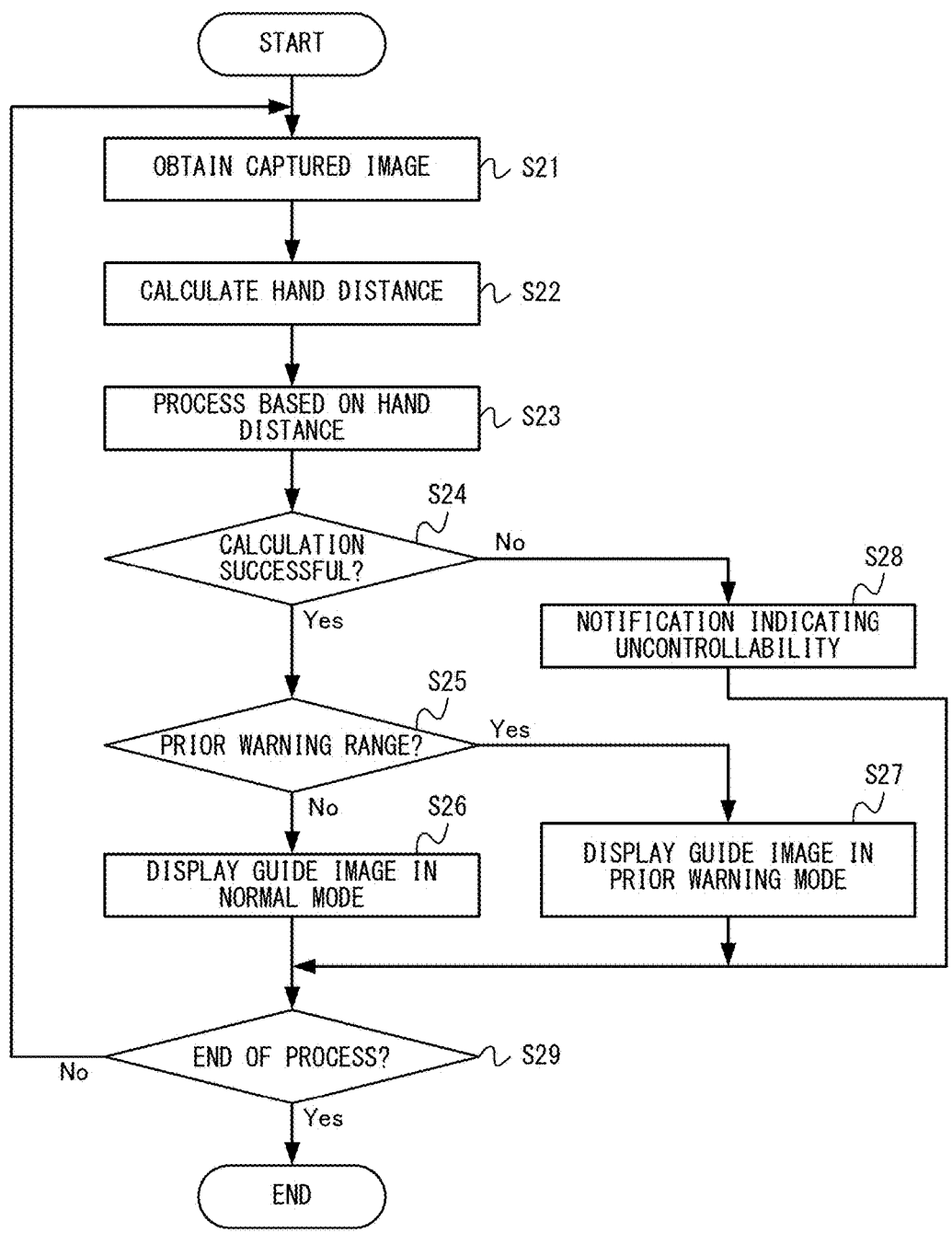
FIG. 27 is a flow chart showing an example of the flow of a process performed by a non-limiting example portable device of the third embodiment.

Next, a specific example of the process performed by the portable device 1 of the third embodiment will be described. FIG. 27 is a flow chart showing an example of the flow of the process performed by the portable device 1 of the third embodiment. A series of processes shown in FIG. 27 may be performed under any condition and with any timing. For example, the series of processes are performed while running a predetermined application program (e.g., a game program) that accepts gesture inputs.

First, in step S21, the control section 14 obtains, from the infrared camera 4, a captured image captured by the infrared camera 4, as in the process of step S1 of the first embodiment. Then, in step S22, the control section 14 calculates the hand distance (the position with respect to the z-axis direction) based on the captured image obtained in step S21. The method for calculating the hand distance may be any method, and the hand distance may be calculated by the calculation method of the first embodiment described above, for example. Note that the calculation of the hand distance may fail when the hand position is in the un-calculatable range or when the hand position is not included in the captured image, as described above.

In step S23, the control section 14 performs an information process based on the hand distance calculated in step S22. The information process may be of any content. In the third embodiment, the control section 14 performs a game process in which the hand distance is used as an input. Specifically, the control section 14 performs a process of controlling the degree of turn of the object 41 in accordance with the hand distance within the virtual game space. Note that if the hand distance is not calculated in step S22, the information process described above is performed while it is considered that no input is being made.

In step S24, the control section 14 determines whether or not the calculation of the hand distance has been successful in the process of step S22. If the determination result of step S24 is affirmative, the process of step S25 is performed. On the other hand, if the determination result of step S24 is negative, the process of step S28 to be described later is performed.

In step S25, the control section 14 determines whether or not the hand position (distance) calculated in step S22 is included in the prior warning range. If the determination result of step S25 is negative, the process of step S26 is performed. On the other hand, if the determination result of step S24 is affirmative, the process of step S27 to be described later is performed.

In step S26, the control section 14 displays an image representing the process results of the information process in step S23 on the display 2, and displays the guide image 42 on the display 2 in a normal display mode (see FIG. 22). Note that the normal display mode refers to the display mode used when the hand position is in the calculatable range and not in the prior warning range (see FIG. 24). In the process of step S26, the indicator image 46 is placed, on the range image 45, at a position in accordance with the hand distance calculated in step S22. Following the process of step S26, the process of step S29 is performed.

In step S27, the control section 14 displays an image representing the process results of the information process in step S23 on the display 2, and displays the guide image 42 on the display 2 in a prior warning mode. Note that the prior warning mode refers to the display mode used when the hand position is in the prior warning range (see FIG. 25). In the process of step S27, the indicator image 46 is placed at the right end position on the range image 45. Following the process of step S27, the process of step S29 is performed.

In step S28, the control section 14 displays an image representing the process results of the information process of step S23 on the display 2, and displays the guide image 42 on the display 2 in such a display mode as to indicate the uncontrollability. Note that "such a display mode as to indicate the uncontrollability" refers to the display mode in a case where the hand position is in the un-calculatable range (see FIG. 26). In the process of step S28, the indicator image 46 is placed at the right end position on the range image 45. Following the process of step S28, the process of step S29 is performed.

In step S29, the control section 14 determines whether or not to end the series of information processes in which the hand distance is used as an input. The specific method of the determination in step S29 may be any method. In the third embodiment, it is determined that the series of information processes are to be ended when the user performs a predetermined end instruction (e.g., an instruction to end the application). If the determination result of step S29 is affirmative, the control section 14 ends the process shown in FIG. 27. On the other hand, if the determination result of step S29 is negative, the control section 14 performs the process of step S21 again. Thereafter, the series of processes of steps S21 to S29 are performed repeatedly until it is determined in step S29 to end the process.

[3. Function/Effect of Third Embodiment]

As described above, in the third embodiment, hand-held information processing device (the portable device 1) calculates the position of the object (the hand of the user) included in the captured image based on the captured image captured by the infrared camera 4 (step S22). The information processing device gives an output in accordance with the position of the object to an output device (the display 2) (step S23). The information processing device displays, on a predetermined display device (the display 2), the guide image 42 including the range image 45 representing a range and the indicator image 46 whose position changes in accordance with the change in the output within the range (step S26, S27).

The "output in accordance with the position of the object" may be an image display output such as that of the third embodiment, or a sound output from a speaker. That is, the portable device 1 may display the guide image on the display 2 in the case where the sound output is changed in accordance with the hand position. The "predetermined display device" may be a display device (the display 2) of the information processing device, or a display device (e.g., a television) that is separate from the information processing device.

As described above, the portable device 1 performs an information process in which a user's operation of moving a hand, etc., is used as an input. That is, since the user can perform input operations by moving a hand, etc., it is possible to make a variety of inputs. As described above, since the portable device 1 displays the guide image, the user can know the position of a hand, etc. Thus, it is possible to improve the controllability for operations using a hand, etc.

Note that in the third embodiment, the infrared camera 4 captures an image of the space in the side surface direction of the housing of the portable device 1. Therefore, the user only needs to move a hand, etc., in the space in the side surface direction of the portable device 1, and the user can easily perform input operations.

The portable device 1 displays the guide image 42 including a predetermined device reference image (the camera reference image 48) on the display 2 so that the positional relationship between the indicator image 46 and the predetermined device reference image corresponds to the positional relationship between the hand and the infrared camera 4 (FIG. 24). Then, the portable device 1 can present to the user about where the hand is with respect to the infrared camera 4 (the portable device 1). Thus, it is possible to improve the controllability for operations using a hand, etc.

Note that it can also be said that the portable device 1 displays the guide image including a predetermined device reference image (the camera reference image 48) on the display 2 so that the positional relationship between the range image 45 and the predetermined device reference image corresponds to the positional relationship between the area and the infrared camera 4. Then, the portable device 1 calculates the position of the object at least within a predetermined area (within the process range shown in FIG. 23). Then, the portable device 1 can present to the user about where the area in which operations using a hand, etc., can be made is with respect to the infrared camera 4 (the portable device 1). Thus, it is possible to improve the controllability for operations using a hand, etc.

When the position of the object cannot be calculated, the portable device 1 changes the display mode of the guide image, as compared with that when the position of the object is calculated (step S28 shown in FIG. 26 and FIG. 27). Then, it is possible to notify the user that the hand position cannot be detected (calculated), and it is possible to improve the controllability for operations using a hand, etc.

When the calculated position of the object is further away toward the un-calculatable area from the predetermined reference position by a predetermined distance or more (when the calculated position is within the prior warning range), the portable device 1 changes the display mode of the guide image, as compared with that when the calculated position is within the predetermined distance (step S27 shown in FIG. 25 and FIG. 27). As described above, when the user attempts to move the position of the object (a hand, etc.) into the un-calculatable range, the portable device 1 can notify the user in advance of the position of the object entering the un-calculatable area. Then, it is possible to reduce the possibility of the user moving the position of the object into the un-calculatable area, thus improving the controllability for operations using a hand, etc.

The portable device 1 calculates, based on the captured image, the position of the object with respect to the image-capturing direction of the infrared camera 4. Then, possible methods for calculating the position of the object include the method based on the brightness in the captured image (the first embodiment), and the method based on the size of the object in the captured image (the second embodiment). Now, if the color or the size of the object is not known (e.g., if the object is an object that inherently has individual differences such as the hand of the user), it is difficult to accurately calculate the absolute position (distance) thereof from the infrared camera 4. Therefore, with these methods, it may be difficult for the user to know about where the user should place the hand in order to obtain an intended output. Regarding this problem, according to the above description, it is possible to present to the user about where the user should place the hand in an easy-to-understand manner, thus improving the controllability for operations using a hand.

The portable device 1 controls the output so as to obtain an output that is in accordance with the relationship between the calculated position of the object and the predetermined reference position (FIG. 23). Then, the portable device 1 displays, on the display 2, the guide image 42 including the process reference image 47 placed at a position corresponding to the reference position within the range represented by the range image 45 (FIG. 24). Then, the user can adjust the hand so that the hand is placed at the reference position by seeing the guide image 42, thereby making it even easier for the user to perform operations.

[4. Variation]

In the third embodiment, the portable device 1 detects a hand-moving operation with respect to a predetermined direction so as to display a guide image representing a position with respect to the direction. Herein, the operation to be detected by the portable device 1 may be any operation, and the display mode of the guide image may be any display mode. Variations of the guide image will now be described.

Figure 28:
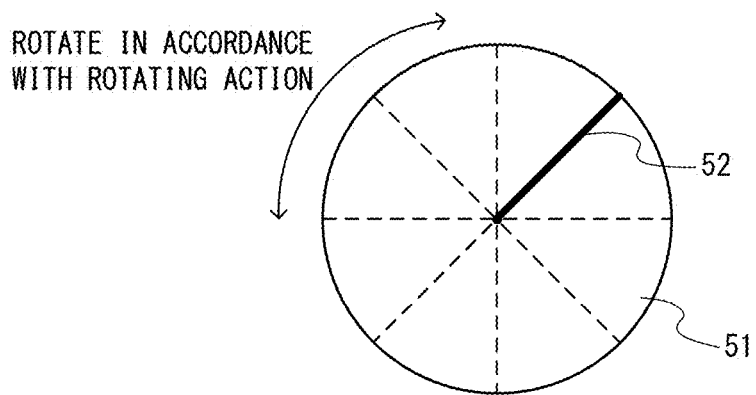
FIG. 28 shows an example of a variation of the guide image.

FIG. 28 shows an example of a variation of the guide image. For example, the portable device 1 may detect a rotating action described above in the first embodiment, and may display the guide image shown in FIG. 28 on the display 2. The guide image shown in FIG. 28 includes a range image 51 and an indicator image 52. The range image 51 is a circular area, and the indicator image 52 is a linear image placed on the range image 51.

Note that as in the third embodiment, the guide image may be displayed as an image different from the image (the game image, etc.) representing the output results of a rotating action. The guide image may be displayed as a part of an image representing the output results of a rotating action. For example, where a game process is performed in which a monocycle that the player character rides advances in accordance with the rotating action, the guide image may be displayed as being the wheel of the monocycle.

In the present variation, the portable device 1 controls the display so that the range image 51 and the indicator image 52 rotate in accordance with the rotating action. For example, the portable device 1 calculates the rotation angle in accordance with the rotating action, and displays the range image 51 and the indicator image 52 rotating, wherein the indicator image 52 represents the calculated rotation angle. Thus, the direction of the indicator image 52 represents the calculated rotation angle. Therefore, the user can know the rotation angle from the direction of the indicator image 52. Note that in other embodiments, the display may be controlled so that the range image 51 is fixed (i.e., does not rotate in accordance with the rotating action) while only the indicator image 52 rotates in accordance with the rotating action.

As described above, the portable device 1 may calculate the direction of the object (rotation angle) based on the captured image, and produce an output in accordance with the direction (display the rotation of the range image 51). Then, the guide image may include an indicator image whose direction changes within the range of the range image (in accordance with the change of the output). Then, the user can know the direction of a hand, etc., from the guide image, thus improving the controllability for operations using a hand.

In other embodiments, the portable device 1 may calculate the two-dimensional position of the object (e.g., a hand), in which case the guide image may represent a two-dimensional range. That is, the guide image may include a range image that represents a two-dimensional range, and an indicator image that represents the calculated two-dimensional position in the two-dimensional range.

Figure 29:
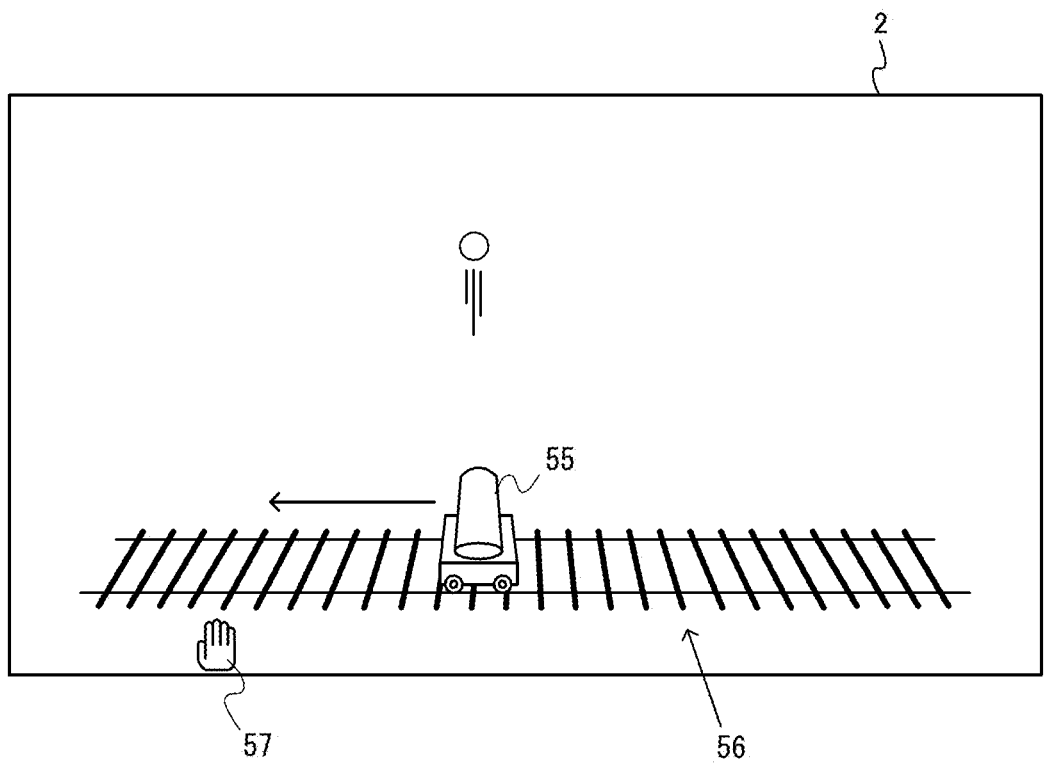
FIG. 29 shows another example of a variation of the guide image.

In other embodiments, the range image included in the guide image may also serve as the object placed in the virtual space (e.g., the game space). FIG. 29 shows another example of a variation of the guide image. FIG. 29 shows a game image displayed on the display 2 by the portable device 1. In the example shown in FIG. 29, the portable device 1 calculates the hand position of the user based on the captured image, and controls the movement of a cannon 55 along a rail 56 in the virtual space in accordance with the calculated hand position.

Specifically, the portable device 1 calculates a target position on the rail 56 based on the hand position, and moves the cannon 55 to the target position. Note that there is an upper limit to the moving speed of the cannon 55, and if the movement of the target position in accordance with the hand position is faster than the maximum speed, the cannon 55 is controlled to move, lagging behind the movement of the target position.

Now, the portable device 1 displays, on the display 2, an indicator image 57 representing the target position on the rail 56 (see FIG. 29). Then, it can be said that the rail 56 is the range image. Thus, a part (the range image, etc.) of the guide image may be an image of an object appearing in the virtual space. Note that also in the example shown in FIG. 29, as in the third embodiment, the indicator image 57 is an image different from the object (the cannon 55) controlled by the user.

In the embodiment described above, the portable device 1 displays the guide image when the hand position is calculated based on the captured image captured by an image-capturing unit (the infrared camera 4). Now, the method for detecting the object present at a position away from the portable device 1 and calculating the position (or the direction) of the object based on the detection result may be any method. For example, in other embodiments, the portable device 1 may display the guide image when the position (distance) of the hand is calculated based on the detection result of the distance measuring sensor 5. That is, the portable device 1 may calculate the position of the object (a hand) based on the output of the distance measuring sensor 5, and control a predetermined output device so as to produce an output in accordance with the position of the object. Then, the portable device 1 may display a guide image including an indicator image of which the position changes in accordance with the change of the output. Also when the distance measuring sensor 5 is used, it is possible to improve the controllability for operations using a hand, etc., by means of the guide image, as in the embodiments described above.

Fourth Embodiment

Next, a fourth embodiment will be described. In the fourth embodiment, the portable device 1 detects, based on a captured image, an operation (touch operation) of touching a side surface of the portable device 1. The portable device 1 performs various information processes (e.g., the process of starting a game, etc.) in response to the touch operation. By allowing for such touch operations, it is possible to improve the controllability. Note that the hardware configuration of the portable device 1 of the fourth embodiment will not be described in detail as it is the same as that of the first embodiment.

Figure 30:
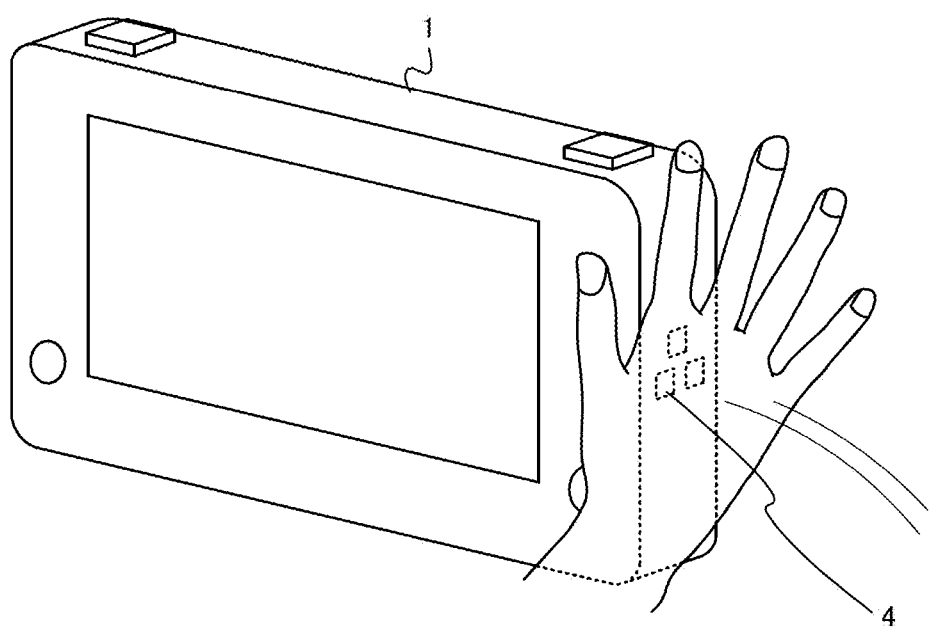
FIG. 30 shows an example of how a user performs a touch operation on a portable device.

FIG. 30 shows an example of how a user performs a touch operation on the portable device 1. As shown in FIG. 30, a touch operation is an operation in which a hand of the user contacts the infrared camera 4. It can also be said that a touch operation is an operation in which (the lens portion of) the infrared camera 4 is covered with the hand. Note that in the fourth embodiment, the portable device 1 detects a touch operation using the brightness of the captured image (e.g., the average value of the brightness of the entire captured image), the details of which will be described later. Therefore, even if the hand is not in contact with the infrared camera 4, a touch operation may be detected if the hand is located in the vicinity of the infrared camera 4. That is, in the fourth embodiment, the touch operation does not require that the hand be in contact with the infrared camera 4 in a strict sense, but it only requires that the hand be placed in the vicinity of the infrared camera 4. For example, the infrared camera 4 may be placed at a depressed position with respect to the surrounding portion of the housing 21 so that the hand of the user does not contact the infrared camera 4. Then, the touch operation is an operation of contacting a portion of the housing 21 around the infrared camera 4 in a strict sense. In the present embodiment, such an operation will be regarded as an operation of contacting the infrared camera 4 with the hand, and will be referred to as a touch operation.

[1. Outline of Process Performed by Portable Device 1]

(Method for Detecting Touch Operation)

Figure 31:
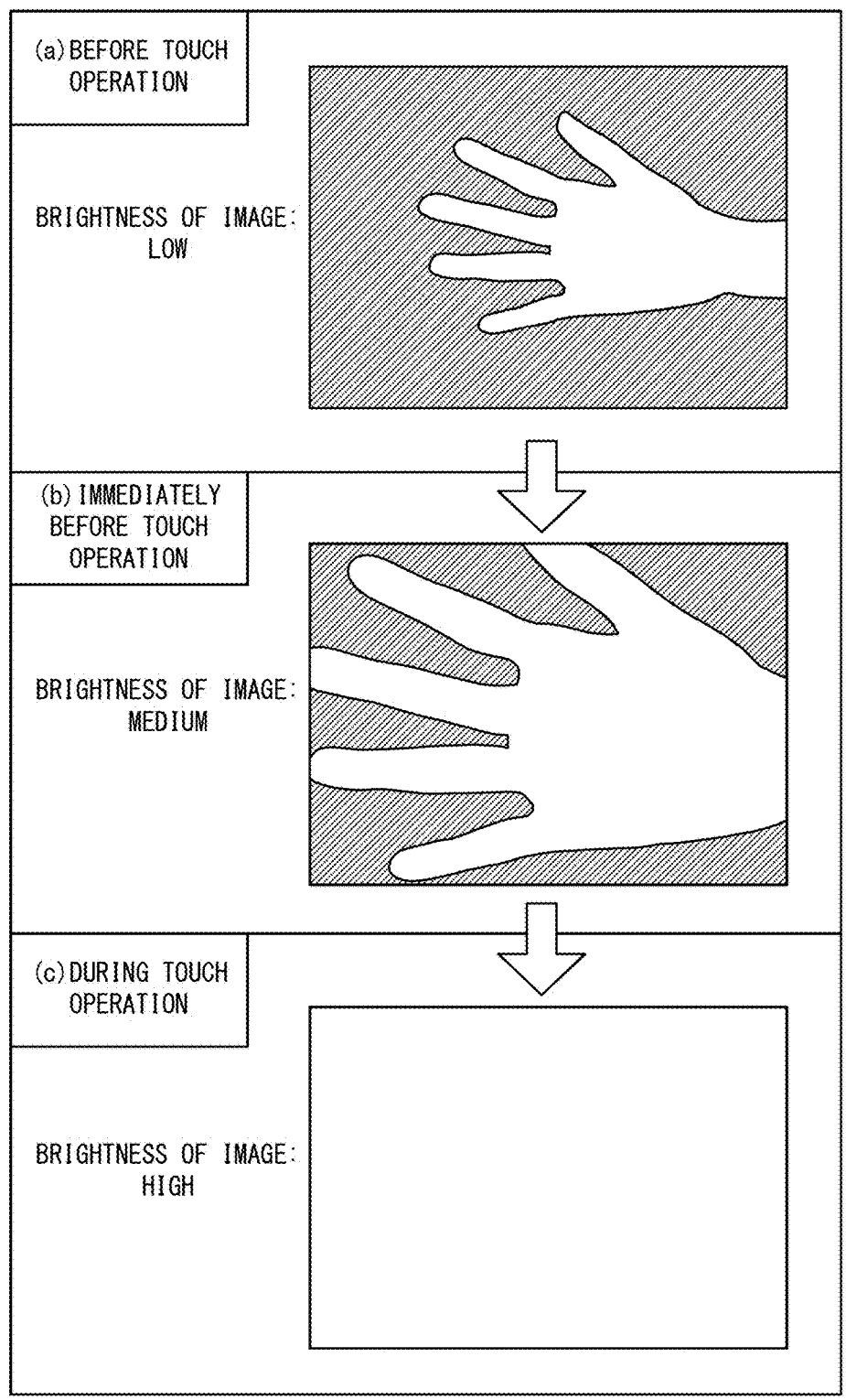
FIG. 31 shows an example of the transition through captured images that are obtained during a touch operation.

Next, a method for detecting a touch operation will be described. FIG. 31 shows an example of the transition through captured images that are obtained during a touch operation. Captured images that are obtained from before a touch operation until when the touch operation is performed will transition as shown in FIG. 31, for example.

The captured image shown in (a) of FIG. 31 is an image that is obtained at a point in time before a touch operation is performed. At this point, the hand of the user is somewhat away from the infrared camera 4, and the entire hand of the user is included in the captured image. In this case, the brightness of the captured image is a normal brightness (a relatively low brightness among FIGS. 31(*a*) to 31(*c*)).

The captured image shown in (b) of FIG. 31 is an image that is obtained at a point in time immediately before a touch operation is performed. At this point, the hand of the user has come quite close to the infrared camera 4, and the hand of the user is partly outside the captured image. In this captured image, the area of the hand of the user is larger than that of the captured image shown in (a) of FIG. 31, and the brightness of the captured image is higher. That is, the brightness of the captured image is higher than the normal brightness (a medium brightness among FIGS. 31(*a*) to 31(*c*)).

The captured image shown in (c) of FIG. 31 is an image that is obtained at a point in time when a touch operation is performed. At this point, the hand of the user is in contact with the infrared camera 4, and therefore the infrared camera 4 is substantially covered by the hand. Therefore, since (substantially) the entire area of the captured image is the hand area, the brightness of the captured image is even higher (than that of (b) of FIG. 31). That is, the brightness of the captured image is even higher than the normal brightness (a relatively high brightness among FIGS. 31(*a*) to 31(*c*)).

As described above, based on the brightness of the captured image, the portable device 1 can determine whether or not a touch operation has been performed. Specifically, the portable device 1 calculates, as the brightness of the captured image, the average brightness value among pixels of the captured image. Then, when the brightness of the captured image is greater than or equal to a predetermined value, the portable device 1 determines that a touch operation has been performed.

Note that in other embodiments, the portable device 1 may calculate the hand distance by using the distance measuring sensor 5, for example. Then, the portable device 1 may determine whether or not the hand has contacted the infrared camera 4 based on the detection result of the distance measuring sensor 5, and may detect a touch operation in accordance with the determination result.

(Information Process Based on Touch Operation)

Next, an example of an information process in which a touch operation is used as an input will be described. In the fourth embodiment, where the portable device 1 performs the game process, the touch operation is used as an operation for starting the game.

Figure 32:
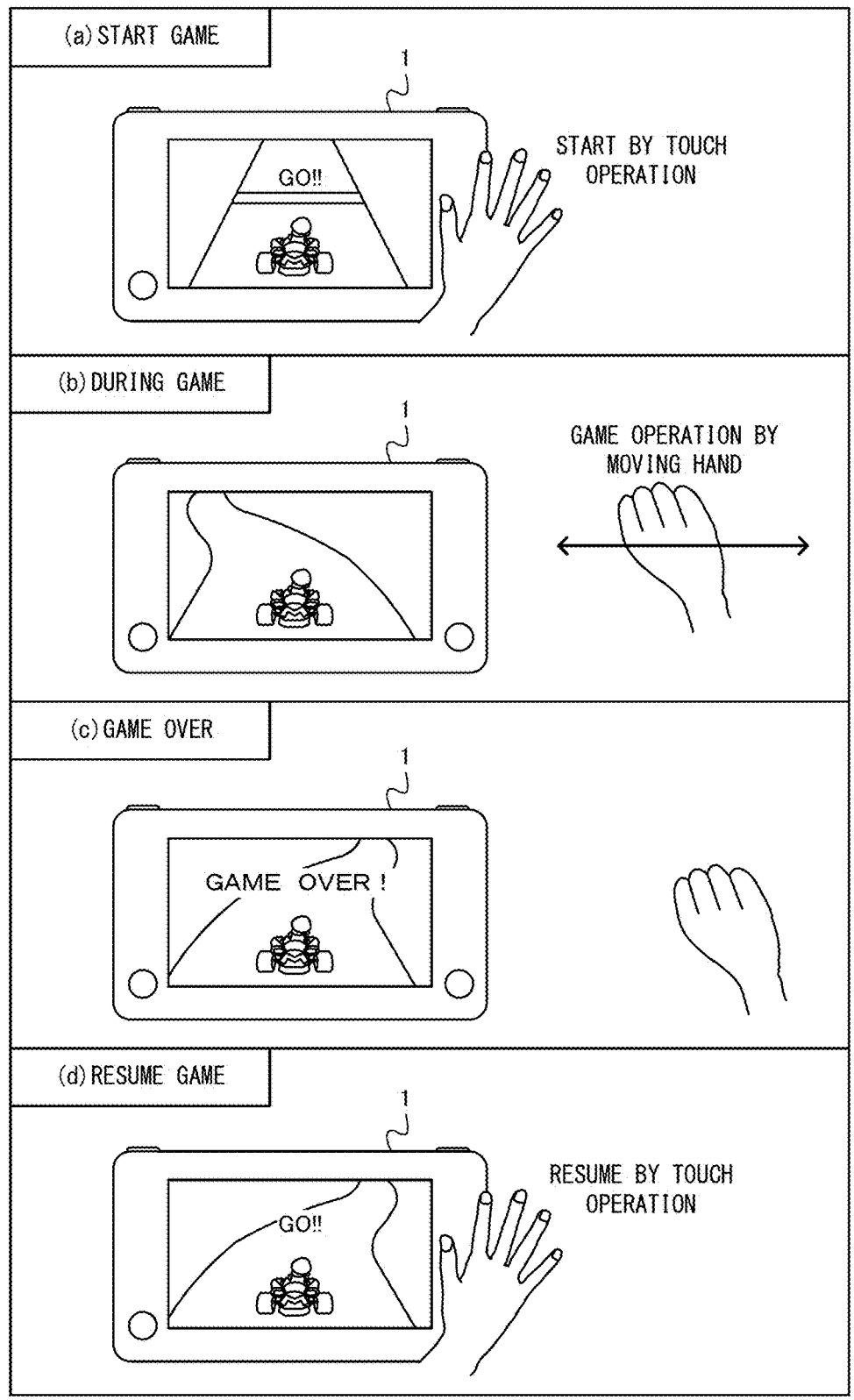
FIG. 32 shows an example of the flow of a game to be played by using a touch operation.

FIG. 32 shows an example of the flow of a game to be played by using a touch operation. Note that while the fourth embodiment is directed to an example where a racing game is played, any game may be played.

In the fourth embodiment, the game is started in response to a touch operation ((a) of FIG. 32). That is, the portable device 1 starts the game (race) in response to detecting a touch operation before the start of the game. Note that the portable device 1 may start the game upon detecting the touch operation, or may start a countdown in response to detecting a touch operation, with the game starting when the count is zero.

During the game (during a gameplay), actions performed with the hand of the user are used as inputs ((b) of FIG. 32). That is, the portable device 1 calculates the position (or the direction) of the hand of the user based on the captured image, and performs an information process (game process) in accordance with the movement of the hand. In the fourth embodiment, the portable device 1 makes the object (player character) move or act based on the calculated hand position.

When a predetermined game condition is satisfied in the game, the game is over ((c) of FIG. 32). That is, when the game condition is satisfied during the game, the portable device 1 stops the game and displays, on the display 2, a game image that indicates that the game is over.

If the user performs a touch operation while a game image indicating the game is over is displayed, the game is started (resumed) ((d) of FIG. 32). That is, the portable device 1 resumes the game upon detecting a touch operation while the game is over. Note that the resumption of the game means to include starting the game in an arbitrary state. For example, the portable device 1 may resume the game from where the game ended, or may start the game from the beginning.

As described above, according to the fourth embodiment, the user can start the game by a touch operation performed on the side surface of the portable device 1. Since the user takes the hand off the infrared camera 4 after performing a touch operation, the hand of the user will naturally be placed within the field of view of the infrared camera 4. That is, after performing a touch operation, the user naturally brings the hand to a position where game operations are performed using the hand, and the user can therefore smoothly perform game operations following the touch operation. Therefore, according to the fourth embodiment, it is possible to improve the controllability for operations when starting the game.

Note that in other embodiments, the information process to be performed in response to a touch operation may be of any content. For example, the portable device 1 may perform an operation of pausing or ending the game in response to a touch operation. For example, the portable device 1 may make an object (player character) perform a predetermined action in response to a touch operation. For example, the portable device 1 may move the object in the virtual space in accordance with the hand position calculated based on the captured image, and make the object perform a predetermined action in response to a touch operation.

[2. Specific Example of Process Performed by Portable Device 1]

Figure 33:
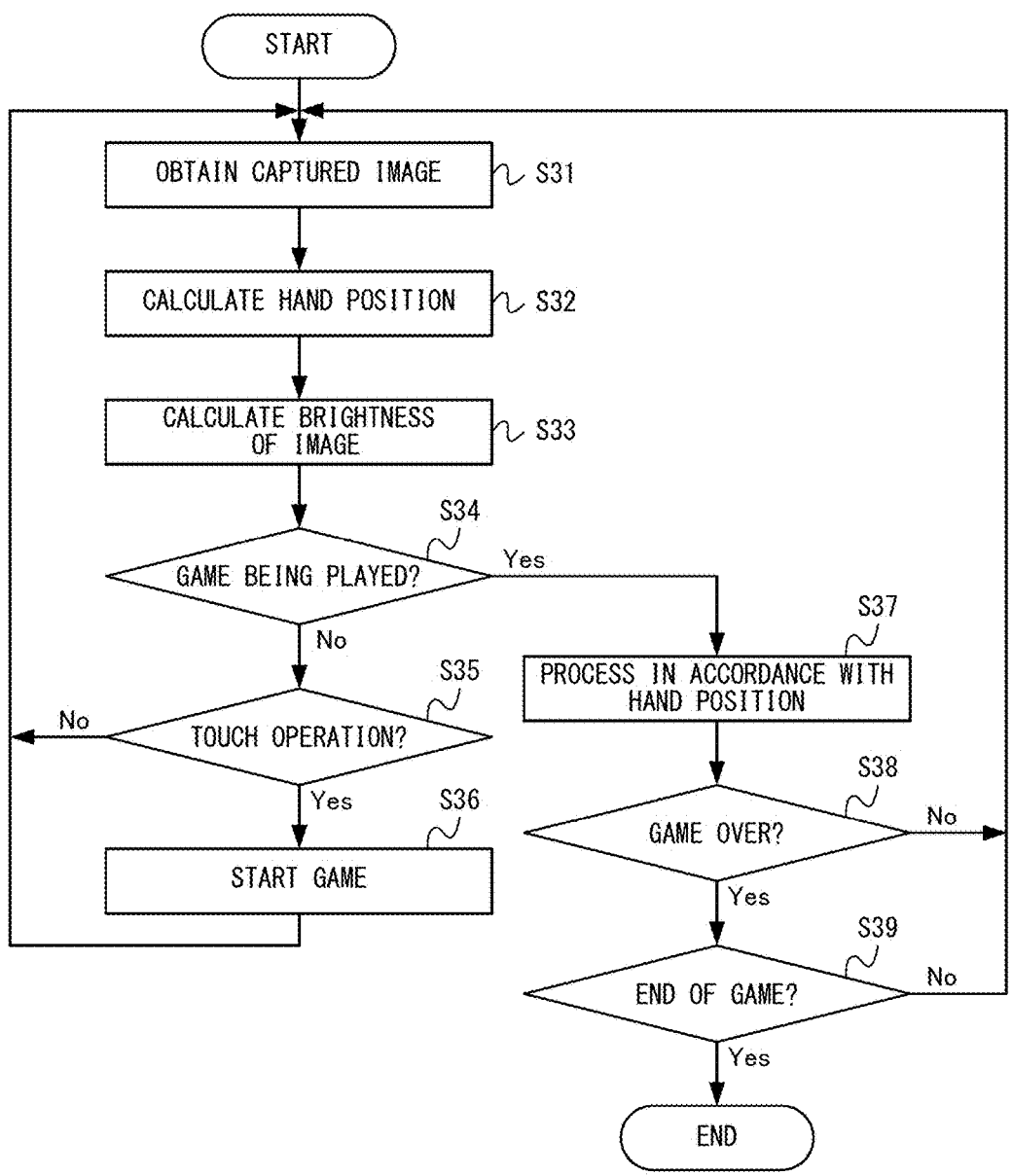
FIG. 33 is a flow chart showing an example of the flow of a process performed by a non-limiting example portable device of a fourth embodiment.

Next, a specific example of the process performed by the portable device 1 of the fourth embodiment will be described. FIG. 33 is a flow chart showing an example of the flow of the process performed by the portable device 1 of the fourth embodiment. A series of processes shown in FIG. 33 may be performed under any condition and with any timing. For example, the series of processes described above are performed while running a predetermined application program (e.g., a game program) that accepts touch operations.

First, in step S31, the control section 14 obtains, from the infrared camera 4, a captured image captured by the infrared camera 4, as in the process of step S1 of the first embodiment. Then, in step S32, the control section 14 calculates the hand position based on the captured image obtained in step S1. Herein, the method for calculating the hand position may be any method, and the hand position is calculated by the calculation method of the first embodiment described above, for example. The calculated hand position may be a position with respect to a predetermined direction, or may be a two-dimensional or three-dimensional position.

In step S33, the control section 14 calculates the brightness of the captured image obtained in step S1. Note that the brightness of the captured image has been calculated in step S32 in order to calculate the hand distance (the position with respect to the z-axis direction), the control section 14 does not need to calculate the brightness again in step S33.

In the fourth embodiment, even if the hand distance is calculated in step S32 and the hand distance is used in the game process (step S37), the portable device 1 can detect a touch operation. That is, the portable device 1 can calculate the hand distance as a game input and still detect a touch operation. For example, when the brightness of the captured image is less than or equal to a predetermined threshold value, the portable device 1 may use the hand distance as a game input, whereas when the brightness of the captured image is larger than the predetermined threshold value, the portable device 1 may determine that a touch operation has been performed.

In step S34, the control section 14 determines whether or not the game is being played (i.e., during a gameplay). If the determination result of step S34 is negative, the process of step S35 is performed. On the other hand, if the determination result of step S34 is affirmative, the process of step S37 to be described later is performed.

In step S35, the control section 14 determines whether or not a touch operation has been performed. This determination is made by the method described in "(Method for detecting touch operation)" above. If the determination result of step S35 is affirmative, the process of step S36 is performed. On the other hand, if the determination result of step S35 is negative, the process of step S31 is performed again. In such a case, the start of the game is on standby until a touch operation is detected.

In step S36, the control section 14 starts the game. After step S36, the process of step S31 is performed again. That is, after the process of step S36, the determination result of step S34 will be affirmative, and a game process (step S37) in accordance with the operation performed by the hand of the user will be performed.

On the other hand, in step S37, the control section 14 performs an information process (game process) in accordance with the movement of the hand of the user. The control section 14 generates a game image representing the results of the information process, and displays the game image on the display 2. While the information process may be of any content, the control section 14 in the fourth embodiment performs an information process of moving a player character in a racing game in accordance with the hand position.

In step S38, the control section 14 determines whether or not the game is over. The specific determination method of step S38 may be any method. For example, the control section 14 determines whether or not a predetermined game condition (the player character hitting an obstacle or falling off a cliff) has been satisfied. If the determination result of step S38 is affirmative, the process of step S39 is performed. On the other hand, if the determination result of step S38 is negative, the process of step S31 is performed again. Thus, the game progresses as the series of processes of steps S31 to S34, S37 and S38 are performed repeatedly until the game is over.

In step S39, the control section 14 determines whether or not to end the game. The specific method of the determination in step S29 may be any method. In the fourth embodiment, it is determined that the game is to be ended when the user gives a predetermined end instruction (e.g., an instruction to end the game application). If the determination result of step S39 is affirmative, the control section 14 ends the process shown in FIG. 33. On the other hand, if the determination result of step S39 is negative, the control section 14 performs the process of step S31 again. Thereafter, the series of processes of steps S31 to S39 are performed repeatedly until it is determined in step S39 to end the process.

Note that in the fourth embodiment, the process of determining whether or not to end the game (step S39) is performed only when the game is over. In other embodiments, the process of determining whether or not to end the game may be performed at any point during the series of processes shown in FIG. 33. For example, the determination process may be performed when the game is paused.

With the process shown in FIG. 33, the game is started in response to a touch operation by the user (step S36), and the game process, in which the movement of the hand of the user is used as a game input, is performed thereafter until the game is over (steps S31 to S34 and S37). Then, after the game is over, the game is resumed in response to detecting a touch operation again (step S36).

[3. Function/Effect of Fourth Embodiment]

As described above, in the fourth embodiment, the portable device 1 detects an operation (touch operation) of bringing an object (the hand of the user) into contact with the infrared camera 4 based on the captured image (step S35), and performs a predetermined information process based on the operation detection result (step S36). Then, the user can give an instruction to the portable device 1 by performing an operation of touching the infrared camera 4. That is, the fourth embodiment enables an unconventional operation, and it is possible to improve the controllability of the portable device 1.

In the fourth embodiment, the infrared camera 4 is provided on the housing 10 of the portable device 1 so as to capture an image of (the space in) the side surface direction of the housing 10. Therefore, the user can perform an operation of touching the image-capturing device from the side surface direction of the housing 10. Then, the user can hold the portable device 1 with one hand and make a touch operation using the other hand, thereby providing a portable device with a good controllability.

In the fourth embodiment, the portable device 1 starts performing the predetermined information process in response to detecting the touch operation. Herein, "starting performing a predetermined information process" means to include resuming to perform an information process that has been stopped (or paused). Note that in other embodiments, the predetermined information process may be stopped (or paused) in response to detecting a touch operation. As described above, the user can instruct to start and/or stop an information process by a touch operation.

In the description above, the portable device 1 calculates object information representing the position of the object based on the captured image (step S32), and performs, as the predetermined information process described above, an information process based on the object information (step S37). Note that in other embodiments, the object information is not limited to the position of the object, but may be information representing the shape of the object and/or the movement of the object. As described above, the user can perform a touch operation and an operation of moving the object, which is a hand, etc., and it is possible to switch between these two operations. Thus, it is possible to improve the controllability of the two operations.

In the fourth embodiment, the portable device 1 calculates object information for an object (a hand) in a state where the object is not in contact with the infrared camera 4 or the vicinity thereof, based on the captured image (step S32). Then, the portable device 1 can easily switch between the process of detecting an operation, and the process of calculating the object information.

In the fourth embodiment, the portable device 1 detects a touch operation based on information (the average brightness value) regarding the brightness of pixels within a predetermined area of the captured image (FIG. 31). Note that while the "predetermined area" is the entire area of the captured image in the fourth embodiment, it may be, in other embodiments, any area that is set independently of the image of the object. As described above, the portable device 1 can easily detect the operation by using information regarding brightness.

[4. Variation]

Note that in other embodiments, the portable device 1 may calculate, in addition to the touch operation, the speed of the touch operation and/or the position of the touch operation, and use them as inputs. An example where the speed of the touch operation or the position of the touch operation is calculated will be described as a variation of the fourth embodiment.

The portable device 1 may calculate the speed of a touch operation (the speed at which the hand comes into contact with the infrared camera 4). That is, the portable device 1 may calculate the amount of time taken from a state where the brightness of the captured image is relatively low to a state where it is relatively high (where a touch operation has been performed) so as to calculate the speed of the touch operation based on the amount of time. Specifically, the portable device 1 calculates the amount of time taken from a state where the brightness of the captured image is less than or equal to a first threshold value to a state where the brightness is greater than a second threshold value. Note that the second threshold value is greater than the first threshold value, and is a threshold value used for determining whether or not a touch operation has been performed.

As described above, the portable device 1 may calculate the speed of a touch operation based on captured images obtained before the touch operation is detected. Then, the portable device 1 may change the content of process of the predetermined information process in accordance with the calculated speed. The predetermined information process may be any information process. For example, the portable device 1 may perform a first process (e.g., a process of starting the game process), as the predetermined information process, when the speed is greater than a predetermined value, and perform a second process (e.g., a process of making a player character perform a predetermined action)

different from the first process, as the predetermined information process, when the speed is less than or equal to the predetermined value.

The portable device 1 may calculate the position of the touch operation (the position at which the hand contacts the infrared camera 4). For example, when the hand of the user contacts the infrared camera 4, the portable device 1 may determine whether the hand has touched an upper-side portion, a lower-side portion or a central portion of the infrared camera 4.

Specifically, the portable device 1 may determine the position of the touch operation by using the hand position in the captured image obtained before the touch operation is performed and/or the hand position in the captured image obtained when the touch operation is performed. The portable device 1 calculates the hand position in a captured image that is obtained immediately before the touch operation is performed (e.g., the captured image shown in (b) of FIG. 31). The hand position may be the center-of-gravity position calculated in the first embodiment. The portable device 1 determines the position of the touch operation based on the calculated hand position (center-of-gravity position). For example, the portable device 1 determines that the user has touched an upper-side portion if the center-of-gravity position is located above the center of the captured image by a predetermined distance or more, determines that the user has touched a lower-side portion if the center-of-gravity position is located below the center of the captured image by the predetermined distance or more, and determines that the user has touched a central portion if the center-of-gravity position is within the predetermined distance from the center of the captured image. Note that in other embodiments, the portable device 1 may calculate the position of the touch operation as coordinates.

Note that in other embodiments, the position of the touch operation may be determined based on a plurality of captured images that have been obtained before the touch operation is performed. For example, the portable device 1 may calculate the center-of-gravity position for a plurality of captured images, and determine the position of the touch operation based on the change in the center-of-gravity position.

As described above, the portable device 1 may determine the position at which a touch operation has been performed on the infrared camera 4 (the position of the touch operation), based on the captured image obtained when the touch operation is detected and/or captured images that have been obtained before the detection. Then, the portable device 1 may change the content of process of the predetermined information process in accordance with the determined position. The predetermined information process may be any information process. For example, the portable device 1 may perform a first process (e.g., a process of starting the game process), as the predetermined information process, when the position of the touch operation is on the lower side with respect to the center of the infrared camera 4, and perform a second process (e.g., a process of making a player character perform a predetermined action) different from the first process, as the predetermined information process, when the position of the touch operation is on the upper side with respect to the center of the infrared camera 4.

<Variation>

(Variation Regarding Portable Device)

While the first to fourth embodiments have been directed to cases where an information processing device including an image-capturing device (the infrared camera 4) is a portable device, an information processing device including an image-capturing device may be of any type. For example, in other embodiments, a controller device to be held in a hand of a user for performing operations may include an image-capturing device. Then, the device for obtaining captured images and performing information processes based on the captured images may be a controller device or another information processing device capable of communicating with a controller device. For example, a controller for making inputs to a home console-type game device may include an image-capturing device, and the game device may perform an information process based on the captured images obtained from the controller. Then, the controller may calculate information regarding the position, etc. (e.g., position, direction, shape and/or changes thereof) of the hand based on the captured images to transmit the information to the game device, and the game device may perform an information process (game process) based on the information received from the controller. For example, an information processing system including a controller and a main unit, to/from which the controller can be attached/detached, may be used to perform a process in accordance with at least one of the first to fourth embodiments above. For example, the controller may include the image-capturing device described above, and may calculate information regarding the position of the hand, etc., (e.g., the position information described above) based on a captured image obtained by the image-capturing device. Then, the main unit may perform a predetermined information process (e.g., a game process) based on the information.

(Variation Regarding Image-Capturing Device)

In the first to fourth embodiments, the infrared camera 4 is used as an example of the image-capturing device (i.e., a camera), and the portable device 1 obtains information representing the brightness value of the infrared image (captured images including such information). Now, in other embodiments, the image-capturing device is not limited to the infrared camera 4, but may be any image-capturing device. For example, in other embodiments, an RGB camera for outputting a captured image having RGB values for each pixel may be used as the image-capturing device.

(Variation Regarding Information Calculated Based on Captured Image)

In the first to fourth embodiments, the portable device 1 calculates the position and/or and the shape of the object (a hand) based on the captured image. Now, in other embodiments, the portable device 1 may calculate the movement of the object as described above.

For example, in other embodiments, the portable device 1 may be a hand-held information processing device, including a housing, and an image-capturing device (the infrared camera 4) capturing an image in the side surface direction of the housing, as in the embodiments described above. Thus, the portable device 1 may detect, based on the captured image, the rotation and/or the speed of the object included in the captured image. The portable device 1 may perform an information process in accordance with the detection result. For example, the portable device 1 may detect the rotating action (see FIG. 13) described above, as the rotation of the object, or may detect the speed of the fanning action (see FIG. 12) or the speed of the touch operation (see FIG. 30) as the speed of the object. Then, the portable device 1 may perform a process of rotating the object in accordance with the detected rotation. The portable device 1 may perform a process of moving the object at a speed in accordance with the detected speed.

Figure 34:
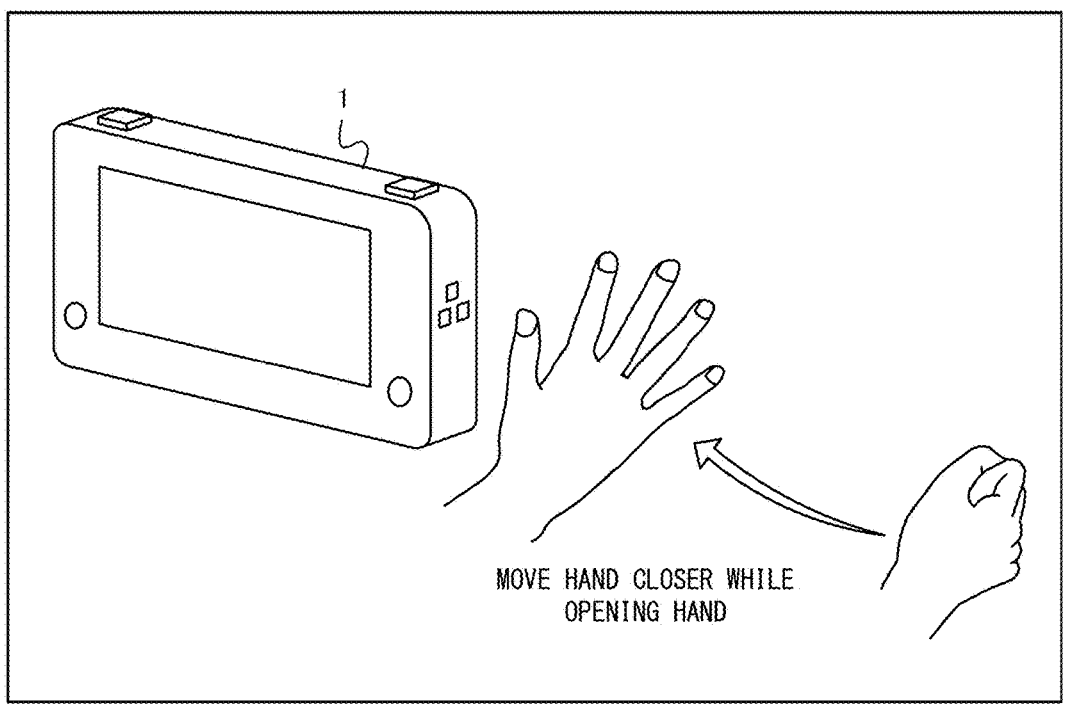
FIG. 34 shows an example of an operation using a hand.

In other embodiments, the portable device 1 may detect an operation based on a combination of the position and the shape of the object. FIG. 34 shows an example of an operation using a hand. In FIG. 34, the user performs an operation of moving the hand toward the infrared camera 4 while opening the hand, starting from the closed-hand position. The portable device 1 may detect such an operation to perform a predetermined information process in response to the operation. For example, in FIG. 34, the portable device 1 may generate and display such an image (movie) that a predetermined object gradually appears from the right end of the display. Then, it is possible to make the user feel as if the object appeared onto the display 2 in accordance with the movement of the hand, thus providing an intuitive and easy-to-understand operation.

When detecting the operation described above, the portable device 1 first calculates the shape and the position of the object included in the captured image based on the captured image (specifically, the position of the object with respect to the image-capturing direction). Then, the portable device 1 detects the operation described above based on a combination of the calculated shape and the calculated position of the object. Specifically, the portable device 1 determines whether or not the operation described above is performed based on whether or not the hand position is moving toward the infrared camera 4 with the shape of the hand changing from the first shape (closed shape) into the second shape (open shape). Note that the method for calculating the hand position and the method for specifying the shape of the hand may be those described above in the first or second embodiment. Whether or not the hand position is moving toward the infrared camera 4 may be determined based on, for example, whether or not the hand position is moving in the negative z-axis direction by a predetermined distance or more (and/or at a predetermined speed or more).

In response to detecting the operation described above, the portable device 1 performs a predetermined information process. Specifically, the portable device 1 generates an image (movie) in which the object appears from the right end of the display 2 (the end portion on the side the infrared camera 4 is provided) and moves toward the center of the screen, and displays the image (movie) on the display 2. The operation described above can be said to be an operation that makes the user feel as if the user were putting something into the portable device 1. Therefore, by performing a process in which the object is displayed on the screen in response to the operation described above, it is possible to provide an intuitive and easy-to-understand operation for the user. Note that the information process to be performed in response to the operation described above may be any process, and may be, for example, a process of installing an application on the portable device 1, a process of putting a data file into a folder, or a process of saving data on the portable device 1. Even when these processes are performed, it is possible to provide an intuitive and easy-to-understand operation for the user.

The portable device 1 may detect an opposite operation from the operation described above, i.e., an operation in which the user moves the hand away from the infrared camera 4 while closing the hand, starting from the open-hand position. Specifically, the portable device 1 determines whether or not the operation described above is performed based on whether or not the hand position is moving away from the infrared camera 4 with the shape of the hand changing from the second shape (open shape) into the first shape (closed shape). In response to detecting this operation, the portable device 1 performs an information process different from the predetermined information process. For example, the portable device 1 may generate an image (movie) in which the object displayed on the display 2 is moved toward the right end of the display 2 (the end portion on the side the infrared camera 4 is provided) and disappears from the screen at the right end, and displays the image (movie) on the display 2. The operation described above can be said to be an operation that makes the user feel as if the user were taking (pulling) something out of the portable device 1. Therefore, by performing a process in which the object disappears from the screen in response to the operation described above, it is possible to provide an intuitive and easy-to-understand operation for the user. Note that the information process to be performed in response to the operation described above may be any process, and may be, for example, a process of deleting a file, a process of grabbing an object (enabling the user to drag the object), and the like. Even when these processes are performed, it is possible to provide an intuitive and easy-to-understand operation for the user.

(Variation Regarding Calculation of Hand Position)

Where the hand position is calculated from the captured image by the method of the first or second embodiment, the calculated hand position may change, in response to a change in the shape or the direction of the hand of the user, even though the hand position has not actually moved substantially. Therefore, the portable device 1 may determine a process of calculating the hand position from the captured image based on the shape of the hand and/or the direction of the hand. For example, where the hand position is determined from the center-of-gravity position as in the first embodiment, the portable device 1 may vary the process (calculation method) for determining the hand position from the center-of-gravity position depending on whether the shape of the hand is a closed shape or an open shape.

(Variation Regarding Input)

In the first to fourth embodiments, the portable device 1 performs a predetermined information process (step S5, S16, S17, S23, S37, etc.) in accordance with the input (the position of the hand of the user, etc.) detected based on the captured image captured by the infrared camera 4. Now, in other embodiments, the portable device 1 may perform an information process based on either this input or an input that is made on another input section. The other input section is, for example, the input button 6 and/or the touch panel 3. Thus, it is possible to provide a variety of operation methods for the user. For example, in the fourth embodiment, the user can touch the side surface (the position of the infrared camera 4) of the portable device 1 and can also touch the display 2, thus realizing a novel operation.

As described above, the embodiment described above is applicable as an information processing device such as a portable device, for example, with the aim of realizing various inputs using a captured image.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising a camera, wherein one or more processor of the information processing system is configured to provide execution including:

calculating, based on a camera image obtained by the camera, a position or a direction of an object included in the camera image;

instructing an output device to produce an output in accordance with the position or the direction of the object; and displaying, on a display device, a guide image including a range image representing a range and an indicator image whose position or direction changes in accordance with a change in the output within the range, wherein the processor is configured to display, on the display device, the guide image including a predetermined device reference image so that a positional relationship between the indicator image and the predetermined device reference image corresponds to a positional relationship between the object and the camera.

2. The information processing system according to claim 1, wherein the camera is configured to capture an image in a side surface direction of a housing of the information processing system.

3. The information processing system according to claim 1, wherein the indicator image is an image representing the object.

4. The information processing system according to claim 1, wherein when a position of the object cannot be calculated, the processor changes a display mode of the guide image, as compared with that when the position of the object is calculated.

5. The information processing system according to claim 1, wherein when the calculated position of the object is further away toward an un-calculatable area from a predetermined reference position by a predetermined distance or more, the processor changes a display mode of the guide image, as compared with that when the calculated position is within the predetermined distance.

6. The information processing system according to claim 1, wherein the processor is configured to calculate, based on the camera image, a position of the object with respect to an image-capturing direction of the camera.

7. The information processing system according to claim 1, wherein:

the processor is configured to control an output to the output device so that the output is in accordance with a relationship between the calculated position of the object and a predetermined reference position; and the processor is configured to display, on the display device, the guide image including a process reference image placed at a position corresponding to the reference position within the range represented by the range image.

8. A non-transitory computer-readable storage medium storing an information processing program to be performed by a computer of an information processing system comprising a camera, the information processing program instructing the computer to execute:

calculating, based on a camera image obtained by the camera, a position or a direction of an object included in the camera image;

instructing an output device to produce an output in accordance with the position or the direction of the object; and displaying, on a display device, a guide image including a range image representing a range and an indicator image whose position or direction changes in accordance with a change in the output within the range, wherein the guide image includes a predetermined device reference image so that a positional relationship between the indicator image and the predetermined device reference image corresponds to a positional relationship between the object and the camera.

9. An information processing device comprising:

a camera, and one or more processors at least configured to:

calculate, based on a camera image obtained by the camera, a position or a direction of an object included in the camera image;

instruct an output device to produce an output in accordance with the position or the direction of the object; and display, on a display device, a guide image including a range image representing a range and an indicator image whose position or direction changes in accordance with a change in the output within the range, wherein the guide image includes a predetermined device reference image so that a positional relationship between the indicator image and the predetermined device reference image corresponds to a positional relationship between the object and the camera.

10. An information processing method to be performed on an information processing system comprising a camera, the method comprising:

calculating, based on a camera image obtained by the camera, a position or a direction of an object included in the camera image;

instructing an output device to produce an output in accordance with the position or the direction of the object; and displaying, on a display device, a guide image including a range image representing a range and an indicator image whose position or direction changes in accordance with a change in the output within range;

wherein the guide image includes a predetermined device reference image so that a positional relationship between the indicator image and the predetermined device reference image corresponds to a positional relationship between the object and the camera.

11. The information processing system according to claim 1, wherein the predetermined device reference image is a camera reference image so that a positional relationship between the indicator image and the camera reference image corresponds to the positional relationship between the object and the camera.

12. The non-transitory computer-readable storage medium according to claim 8, wherein the predetermined device reference image is a camera reference image so that a positional relationship between the indicator image and the camera reference image corresponds to the positional relationship between the object and the camera.

13. The information processing device according to claim 9, wherein the predetermined device reference image is a camera reference image so that a positional relationship between the indicator image and the camera reference image corresponds to the positional relationship between the object and the camera.

14. The method according to claim 10, wherein the predetermined device reference image is a camera reference image so that the positional relationship between the indicator image and the camera reference image corresponds to a positional relationship between the object and the camera.

* * * * *